United States Patent [19]

Blackmer et al.

[11] Patent Number: 5,393,236

[45] Date of Patent: Feb. 28, 1995

[54] INTERACTIVE SPEECH PRONUNCIATION APPARATUS AND METHOD

[75] Inventors: Elizabeth R. Blackmer, Lexington, Va.; Linda J. Ferrier, Lexington, Mass.

[73] Assignee: Northeastern University, Boston, Mass.

[21] Appl. No.: 951,675

[22] Filed: Sep. 25, 1992

[51] Int. Cl.$^6$ .............................................. G09B 5/00
[52] U.S. Cl. ................................. 434/169; 434/185; 434/308; 381/51; 364/419.03
[58] Field of Search ............... 434/156, 167, 169, 185, 434/307–309, 319, 320, 365; 381/35, 43, 51–53; 364/419, 419.01, 419.03; 395/2, 152, 927

[56] References Cited

U.S. PATENT DOCUMENTS

| | | |
|---|---|---|
| 4,030,211 | 6/1977 | McGinley . |
| 4,048,729 | 9/1977 | Derks . |
| 4,096,645 | 6/1978 | Mandl . |
| 4,158,264 | 6/1979 | Orth . |
| 4,170,834 | 10/1979 | Smart . |
| 4,212,119 | 7/1980 | Tomatis ............................... 434/156 |
| 4,380,438 | 4/1983 | Okamoto . |
| 4,406,626 | 9/1983 | Anderson et al. . |
| 4,460,342 | 7/1984 | Mills . |
| 4,520,501 | 5/1985 | DuBrucq . |
| 4,586,905 | 5/1986 | Groff . |
| 4,591,929 | 5/1986 | Newsom . |
| 4,615,680 | 10/1986 | Tomatis . |
| 4,641,343 | 2/1987 | Holland et al. ................. 434/185 X |
| 4,698,776 | 10/1987 | Shibata . |
| 4,722,621 | 2/1988 | Johnson . |
| 4,737,110 | 4/1988 | Masuda . |
| 4,907,274 | 3/1990 | Nomura et al. . |
| 4,969,194 | 11/1990 | Ezawa et al. . |
| 5,010,495 | 4/1991 | Willetts . |
| 5,038,377 | 8/1991 | Kihara et al. . |
| 5,056,145 | 10/1991 | Yamamoto et al. ................ 381/51 |
| 5,065,317 | 11/1991 | Hiramatsu et al. . |
| 5,111,409 | 5/1992 | Gasper et al. ..................... 395/152 |
| 5,180,307 | 1/1993 | Hiramatsu ..................... 434/185 X |

FOREIGN PATENT DOCUMENTS 0360909 4/1990 European Pat. Off. ............ 434/185

Primary Examiner—Richard J. Apley
Assistant Examiner—Joe H. Cheng
Attorney, Agent, or Firm—Weingarten, Schurgin, Gagnebin & Hayes

[57] ABSTRACT

An interactive speech pronunciation system for teaching pronunciation and reducing the accent of a user includes a memory for storing a plurality of presequenced lessons, an input interface for allowing a user to select predetermined ones of the presequenced lessons, a processor for executing program steps corresponding to the lessons selected by the user, and a monitor for displaying visual indicators to the user of the system. The speech pronunciation system further includes an audio input device, for recording sounds spoken by the user, an audio output device for transducing signals fed thereto to pre-recorded sounds and a speech processor for providing stored signals to the audio output device.

12 Claims, 35 Drawing Sheets

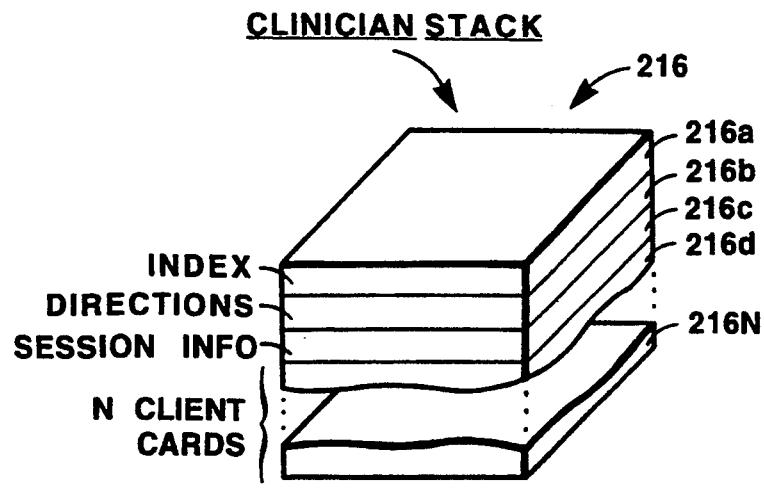
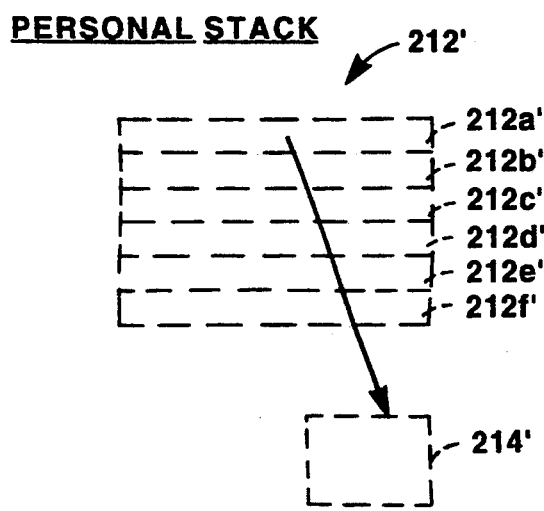
Fig. 2B

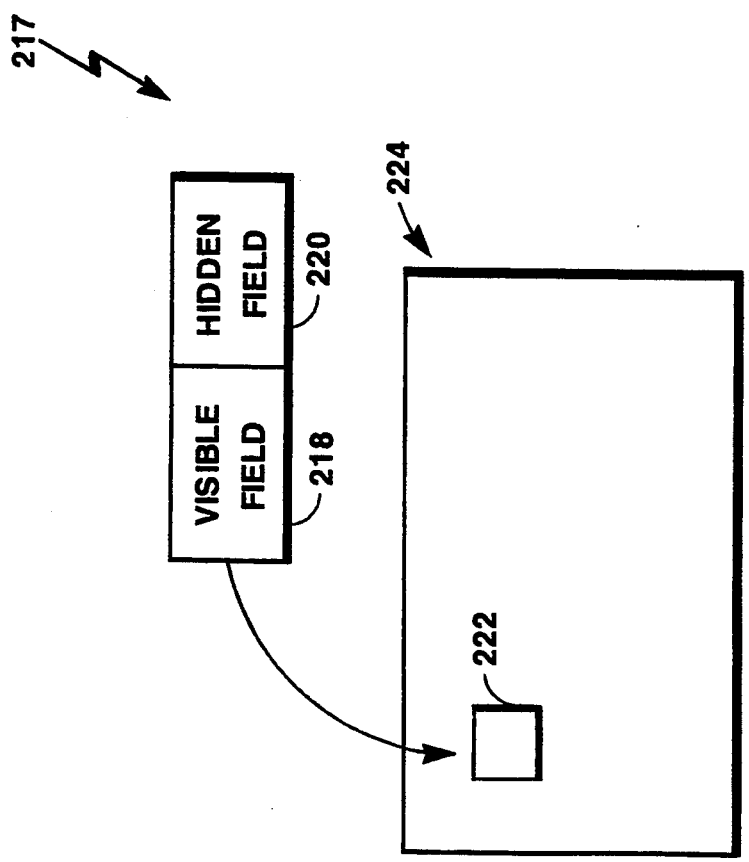

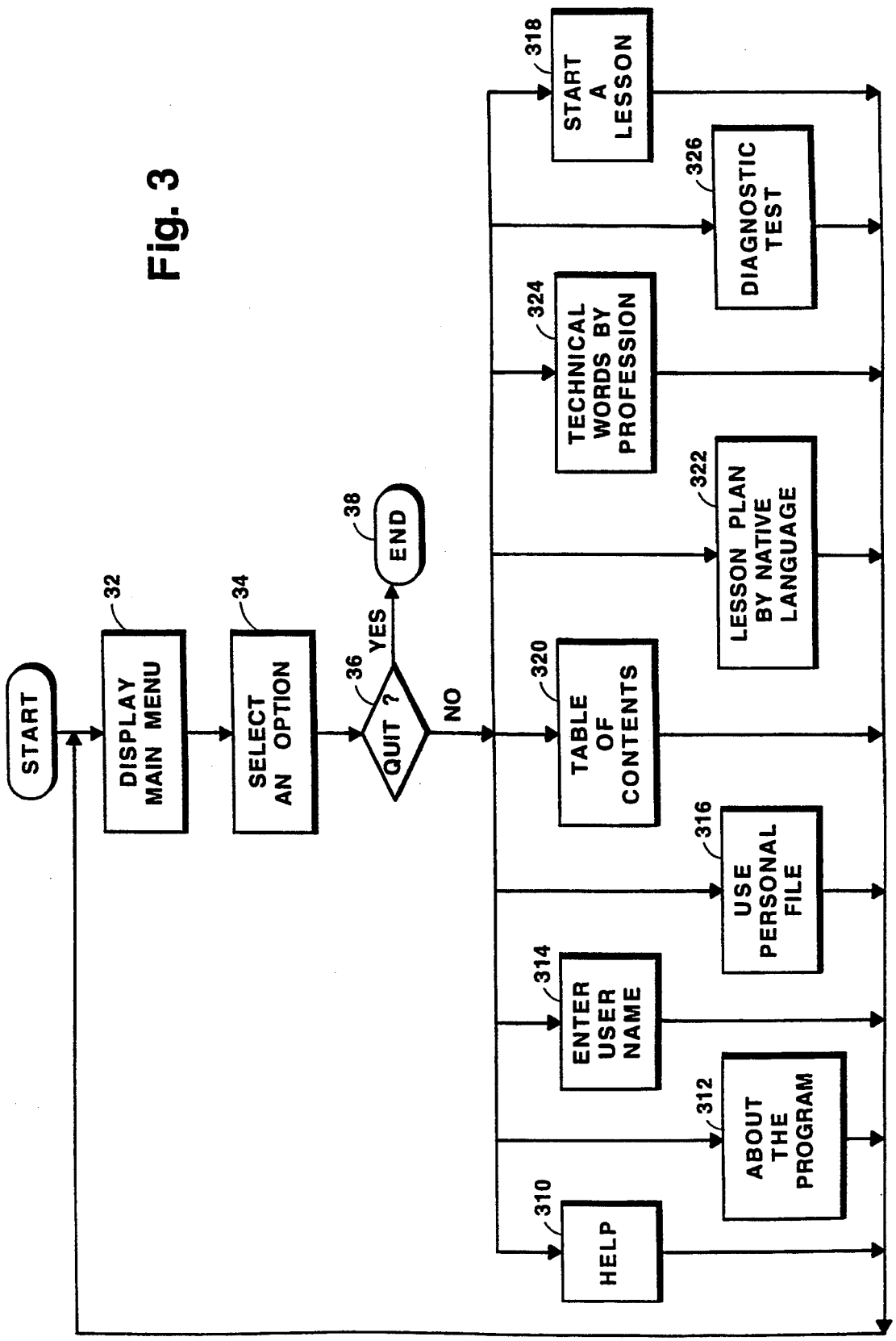

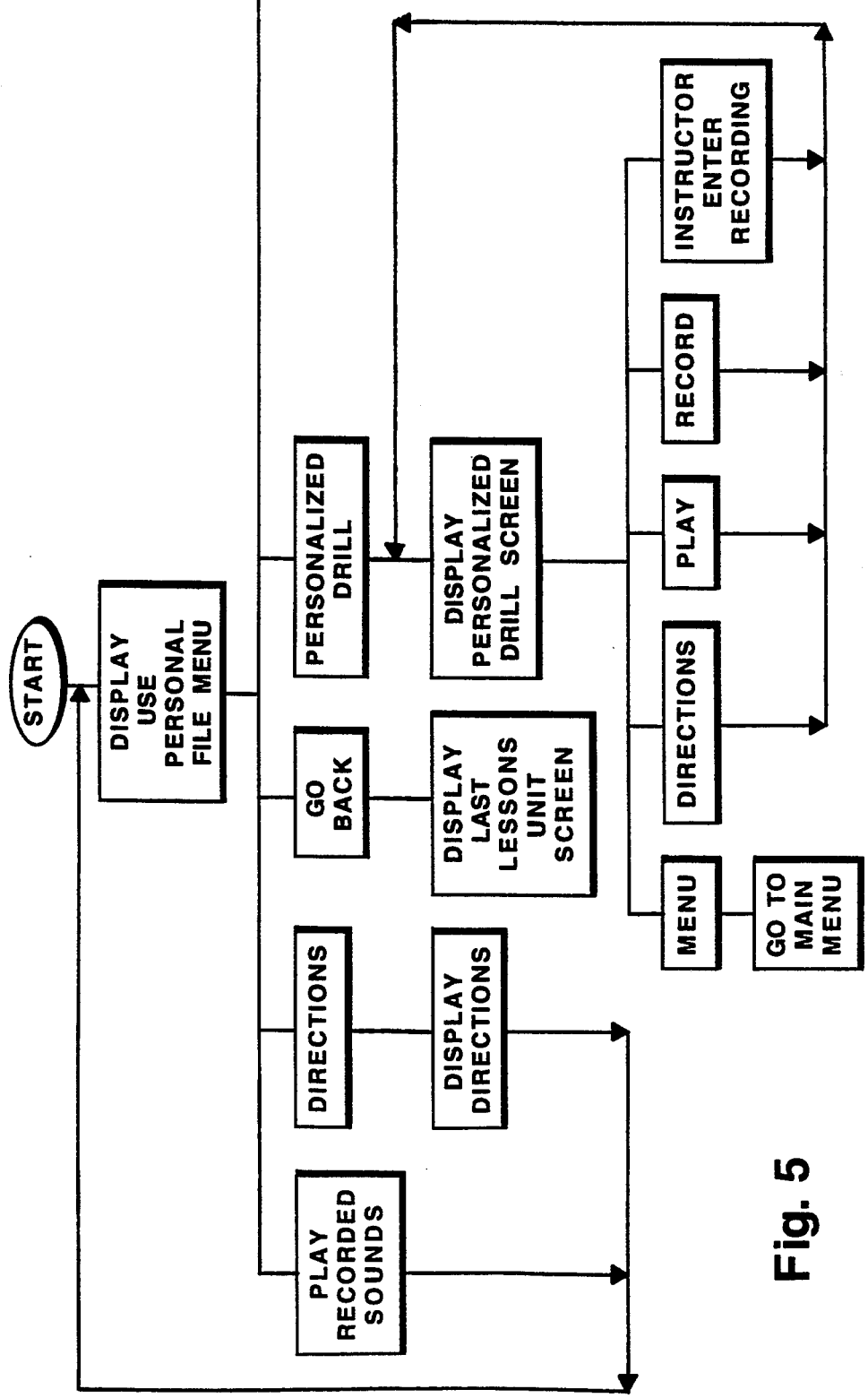

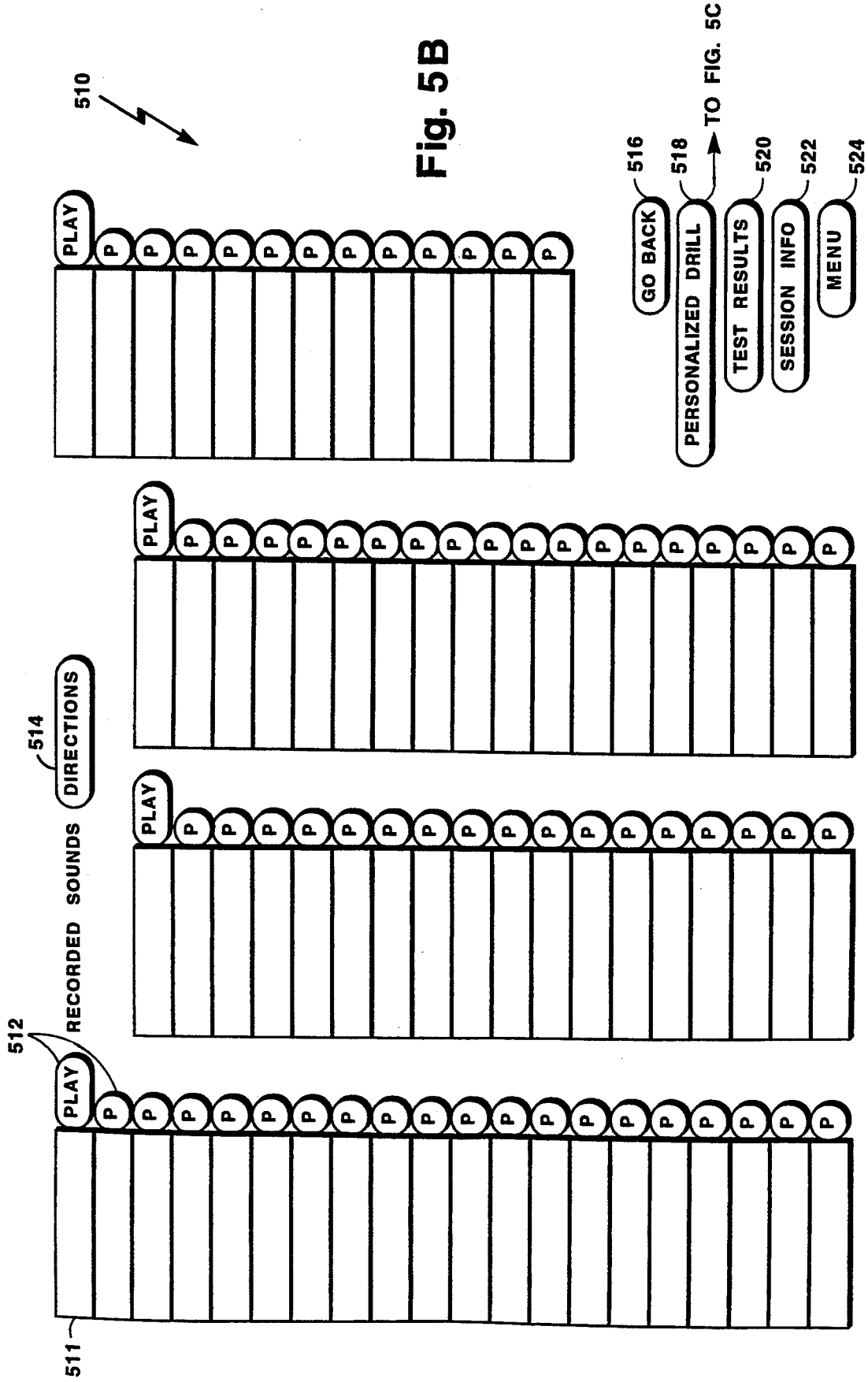

CLEARER ENDINGS

620

IN ENGLISH MANY DIFFERENT CONSONANTS OCCUR AT THE END OF WORDS. IT IS IMPORTANT TO PRONOUNCE THEM CLEARLY BECAUSE THEY CARRY MUCH INFORMATION. FOR EXAMPLE, THE ENDS OF WORDS ARE USED FOR THE PAST TENSE (-ed) AND THE PLURAL (-s).

IN UNIT 2, YOU CAN PRACTICE PRONOUNCING THREE PAIRS OF CONSONANTS AT THE ENDS OF WORDS. ONE MEMBER OF EACH PAIR IS PRESENTED IN UNIT 1.

THE DIFFERENCE BETWEEN THE THREE PAIRS IS CALLED "VOICING". TO LEARN ABOUT VOICING CLICK ON THIS BUTTON: ( VOICING ) 622

THERE ARE MANY PAIRS OF CONSONANTS IN ENGLISH WHICH DIFFER IN VOICING. TO SEE THESE PAIRS AND LISTEN TO WORDS TO ILLUSTRATE THEM CLICK ON THIS BUTTON: ( PAIRS ) 624 → TO FIG. 6B

OK, CLICK ON A BUTTON BELOW TO START PRACTICING VOICED AND UNVOICED SOUNDS.

( "t" and "d" )  ( "p" and "b" )  ( "k" and "g" )  ( MENU )
625a            625b            625c            627
        ↓
      TO FIG. 6C

Fig. 6A

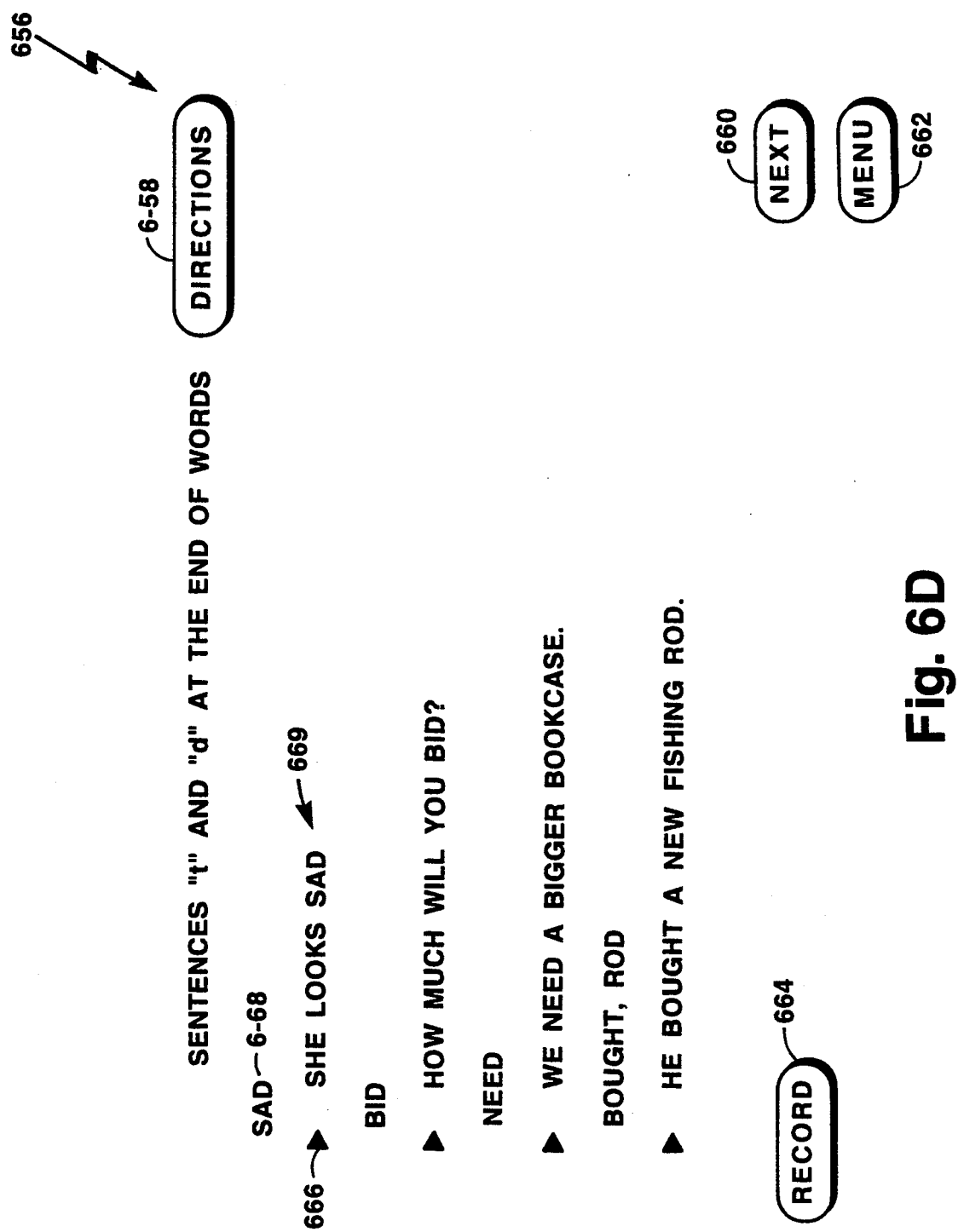

LESSON PLAN FOR SPEAKERS OF POLISH

SUGGESTED LESSON SEQUENCE

UNIT: 17 (ESPECIALLY PART C), 2, 3A AND C, 7B, 11A AND B, 16, 23, 13A, 14 (PRACTICE ANY "V" SOUNDS AT THE ENDS OF WORDS IN THIS UNIT BUT NOT IN OTHER PARTS OF THE WORDS), 15B AND C, 10, 8, 9C, 19, 4, 5, 20, 21, 22, 24. PRACTICE PROFESSIONAL VOCABULARY IN ALL OF THE UNITS, ESPECIALLY WORDS WITH MORE THAN TWO SYLLABLES. WORK ON MEMORIZING THE STRESS PATTERNS OF TECHNICAL WORDS, AND USE THE STRESS MARKS IN THE DICTIONARY WHEN LOOKING UP NEW WORDS.

WE KNOW THAT EVERY PERSON HAS UNIQUE SPEECH PATTERNS, AND SOME LANGUAGES HAVE MANY DIALECTS. BUT SPEAKERS OF ONE LANGUAGE OFTEN HAVE SIMILAR PROBLEMS PRONOUNCING ENGLISH. WE HOPE THAT THIS LESSON PLAN WILL BE HELPFUL, ESPECIALLY AT THE BEGINNING.

FOR OTHER LESSON SEQUENCE IDEAS, LOOK AT THE LIST OF UNITS (CLICK "UNIT CONTENTS") OR TAKE THE DIAGNOSTIC TEST.

CLICK ON A UNIT NUMBER TO START.

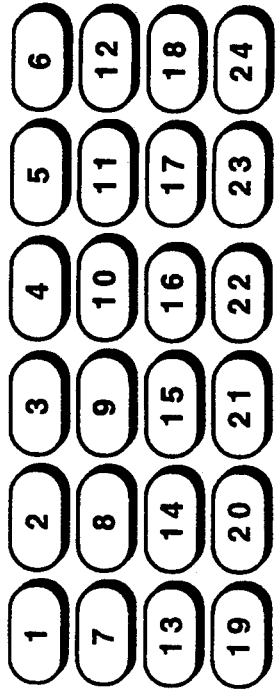

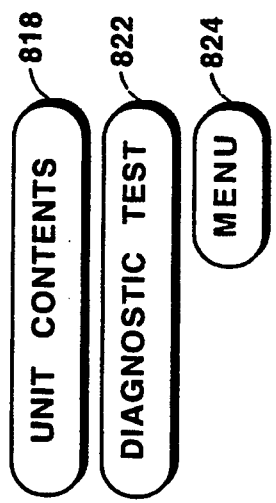

FIG. 8B

INTERACTIVE SPEECH PRONUNCIATION APPARATUS AND METHOD

FIELD OF THE INVENTION

This invention relates generally to language learning systems and more particularly to interactive speech pronunciation systems.

BACKGROUND OF THE INVENTION

As is known in the art, because of increased mobility of people throughout the world increasing numbers of people are now residing in countries where their native language is not widely spoken. For example, immigrants who are non-native speakers of the English language are entering the United States. Many of these immigrants are proficient in written English however, because of poor pronunciation due to accents they are unintelligible when they speak. The problem of lack of intelligibility in non-native speakers of English may be particularly recognized at universities which have immigrants working as teaching assistants (TAs). This is particularly true in the science and engineering fields. The need has thus arisen for improved accent reduction services.

Courses which teach English as a second language, for example, have been used for this purpose. A widely accepted aspect of current theory in such courses includes training in self-monitoring. Self-monitoring in this context includes graded exercises in listening to oneself speak, while focusing on a particular production feature. Self-monitoring in the sense of listening to oneself during the act of speaking, while useful, is not particularly easy.

In traditional audiotape lessons the act of speaking may be separated from the act of listening to one's own speech. While self-recording is possible with most instructional audiotapes, the learners very seldom actually listen to their recordings. Rewinding the tapes is awkward and results in an unacceptable delay. Listening to the self-recordings is not an integral part of using the tapes, but rather an additional feature which has the result of slowing down the time to complete the lesson and thus to users this feature appears to be "extra work." Furthermore, in such systems user control of the timing and sequencing of exercises and the number of repetitions is often minimal. This results in a passive learning experience. Lastly, the tasks to be performed in the audiotape lessons generally focus on the learning of syntactic structures through exercises such as substitution drills, with improvement of pronunciation being a subsidiary goal.

While courses which teach immigrants a second language may be the natural context in which immigrants may improve their pronunciation, such courses are usually oversubscribed, the language is taught at too basic a level, and it is difficult to address the pronunciation problems of specific individuals. Furthermore, instructors in such courses often have little training in language pathology or articulation therapy.

Speech-language pathologists, having an educational background in phonetics and articulation therapy, are well-equipped to provide this service. Speech-language pathologists are appropriate instructors for immigrants and some speech-language pathologists have developed specializations in this area. Nevertheless, the need for such services seems to be growing more rapidly than the services available.

One solution to this problem has been to provide language learning systems which use visual displays to aid speakers in identifying problems in their speech. One such system employs a spectrographic display of speech signals which may be used to train speakers to correct articulation errors. However, several problems exist with the spectrogram technique such as the fact that not all articulatory features may be visible in the spectrograph, the use of spectrograms requires both considerable knowledge on the part of the clinician and extensive guidance to the client. Furthermore it may be difficult to generalize the acquired articulations to spontaneous speech. Moreover, while visual feedback is useful in identifying problems, the user eventually relies on the auditory system to improve pronunciation.

SUMMARY OF THE INVENTION

In accordance with the present invention, an interactive speech pronunciation system for teaching pronunciation and reducing the accent of a user includes a memory for storing a plurality of presequenced lessons, an input interface coupled to the memory, for allowing a user to select predetermined ones of the presequenced lessons, a processor, coupled to the memory and the input interface for executing program steps corresponding to the lessons selected by the user, and a monitor coupled to the processor for displaying visual indicators to the user of the system. The speech pronunciation system further includes an audio input device, coupled to the processor for recording sounds spoken by the user, an audio output device for transducing signals fed thereto to prerecorded sounds and a speech processor, coupled to the processor and the audio output device, for providing stored signals to the audio output device. With this particular arrangement, an interactive speech pronunciation system for improving the pronunciation and reducing the accent of a user is provided. The system memory has a series of organized and sequenced lesson plans stored therein, thus an instructor (e.g. a speech language pathologist) need not originate lesson plans or text and corresponding sounds for a user. The input interface allows the user, or alternatively an instructor, to control the sequence in which the program and lesson steps are performed. The processor executes program steps and provides visual indicators and instructions to the user via the monitor. Thus minimal supervision is required which may lead to a concomitant reduction in the cost of speech lessons. The system provides a technique wherein a user may record their own voice and compare their recorded voice to a digitized auditory model. In contrast to visual feedback systems, the present invention relies on the auditory system of the user, employing a process referred to as "enhanced monitoring."

The lesson sequences may start with simple material and may lead to the mastery of a multi-syllabic professional vocabulary within phrasal contexts. Furthermore, since minimal supervision is required, the instructor (e.g. a speech-language pathologists) may more efficiently and creatively utilize the study time. Achieving a level of automaticity in speaking may require extensive drilling. The prior art approaches require the speech-language pathologist to provide intensive articulation therapy to clients on an individual basis which is very time consuming. Thus, the processor controlled speech pronunciation system reduces the amount of time which speech-language pathologists must spend conducting such intensive articulation therapy.

Furthermore the prestored lessons may be accessed according to the native language of a user. Thus the instructor may select appropriately structured drills for speakers of various languages. That is, the lesson sequences and contents may be selected for users having a particular native language such as Chinese, for example, trying to learn a second language, such as English for example.

The present invention emphasizes articulation of phonemes, words, phrases and sentences. Information on semantics and pragmatics may also be provided in a supplementary manner. The system optionally allows the instructor to customize the content of the lessons by adding to a particular lesson vocabulary that may be of special difficulty or of special interest to the user. Thus, the sequenced lessons may be customized to meet the requirements of specific immigrant persons including those immigrants having a technical vocabulary.

The system also provides a plurality of frequently used technical terms which may be especially difficult for non-native speakers of a language to pronounce. Such technical terms may be organized by subject matter for example. The self-recording feature used in the lessons is available for practice of these technical terms. A user may practice pronouncing the technical terms as an adjunct to, or extension of, the lessons.

The user may store correct and incorrect dated versions of their utterances in digitized form in the memory. These stored utterances may be later retrieved from the memory and used to monitor user progress. Such stored utterances may also be used for record keeping by the instructor.

The system also provides each user with a particular file which may contain the correct and incorrect utterances of the user, the lesson sequence plan, notes made by either the user or the instructor, and recordings of vocabulary of particular difficulty and interest for the user. The self-recording feature used in the lessons is available for practice of these terms.

The lessons and material are sequenced according to the complexity of the sound patterns to be mastered, thus providing the framework and material for an entire course or therapy plan. The content is organized with a sequence of sound targets that the user should practice and become proficient in the use thereof.

The system further provides an optional diagnostic test which may be used to determine which sounds the user has difficulty speaking and which lessons may be most useful for the user. Results from the diagnostic test may be linked to a specific lesson sequence in which particular sounds are identified to be practiced by the user. The diagnostic test may be displayed on the monitor and the client's responses may be recorded on an audiotape or in the memory and scored on the monitor by the instructor. The system provides a summary result and a suggested lesson plan based on the results of the diagnostic test.

The system further includes a file which may be used by the instructor to enter information including but not limited to session notes, billing information, personal comments on the user, and long and short-term therapy goals.

The user interface device may include a graphical user interface (GUI) such as a mouse for example. The GUI may be used to select one of a plurality of program options which appear as icons on screens which are displayed on the monitor.

Another optional feature of the program allows the instructor to maintain a record of correct and incorrect utterances using the keyboard while the user simultaneously uses the GUI to select program options and perform selected lessons. The program calculates the percentage of correct and incorrect utterances for a set of target words, for example, and saves the results in the file corresponding to a particular user to thus document the user's progress.

The speech pronunciation system also provides suggested lesson plans organized according to the first language (mother tongue) of the user to thus provide lesson planning assistance to the user or the clinician.

BRIEF DESCRIPTION OF THE DRAWINGS

The foregoing features of this invention, as well as the invention itself, may be more fully understood from the following detailed description of the invention in conjunction with the drawings in which:

FIG. 3 is a flow type diagram of the program options provided from a Main Menu Stack;

FIGS. 5 and 5A are a series of flow type diagrams of the program options available from a Sample Stack;

FIGS. 5B–5E are a series of graphical illustrations of a series of screens available from the Sample Stack;

FIGS. 6A–6E are a series of graphical illustrations of screens available from a the Unit Lesson Stack;

FIGS. 8A and 8B are a series of graphical illustrations of screens available from the Native Languages menu;

DESCRIPTION OF THE PREFERRED EMBODIMENTS

Figure 1:
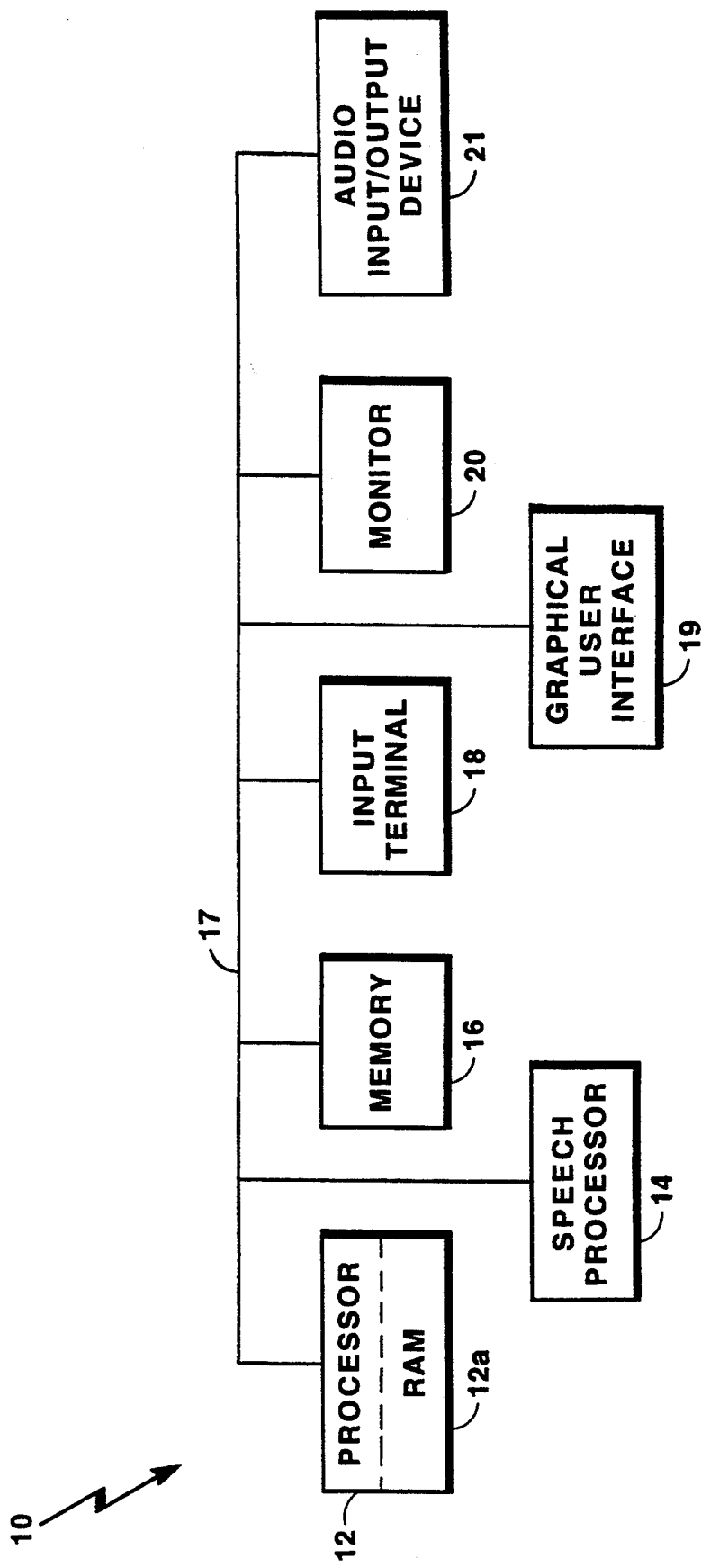
FIG. 1 is a block diagram of a language learning system in accordance with the present invention.

Referring now to FIG. 1, an interactive speech pronunciation system 10 for teaching pronunciation and accent reduction to a user is shown to include a processor 12 having an internal random access memory (RAM) 12a, a speech processor 14, an external memory 16, an input terminal 18, a graphical user interface 19, a monitor 20, and an audio input/output device 21. Each of the above recited components are coupled to each other via a data and communication bus 17.

The processor memory 12a may be used to store program steps to be herein described which may be executed by the processor 12. Suitable processors may be found, for example, in any of the so-called personal computers such as an IBM or Macintosh ™ personal computer. The speech processor 14 processes prerecorded speech sounds and is preferably provided as the type which utilizes digitized recordings rather than synthesized speech, however any means of providing realistic, exact and sound pleasing speech may be used. The speech processor 14 also converts analog audio signals fed thereto from the audio input/output device 24 to digitized data which may be stored in the memory 16. Thus, the speech processor 14 may include, for example, any of the commercially available devices such as a MacRecorder ™ for digitizing speech.

The memory 16 may be provided as a so-called hard type disk drive, a so-called floppy disk drive and associated floppy disks, a so-called CD read only memory (CD ROM) or any other appropriate storage device which may be used to supplement the processor memory 12a. The memory 16 has stored thereon a plurality of presequenced lessons and program steps to be described below in conjunction with FIGS. 3–11 which the processor 12 may access and execute.

The input terminal 18 may be provided as a conventional keyboard and the GUI 19 may be provided as a mouse for example.

The monitor 20 may be provided as any of the conventional cathode ray tube (CRT) or liquid crystal type displays.

The audio input/output device 21 may include a microphone and speaker provided as a conventional headset type speaker/microphone arrangement or alternatively the audio input/output device 21 may be provided as an external speaker and separate microphone each of which may have amplifying and/or filtering circuits required to provide high quality recordings, high quality sound, increased volume, etc.

An exemplary embodiment of the invention for use on a Macintosh ™ computer with a HyperCard ™ programming environment is herein described. Those of skill in the art, however, will recognize that the options provided by the interactive speech pronunciation system 10 may be configured to operate on any processing system.

Terminology

Before describing details of the interactive speech pronunciation system 10 and the processing steps performed by the system 10, some introductory concepts and terminology are explained. A "screen" is defined as a pictorial representation which is displayed on the monitor 20 (FIG. 1). A "screen field" is defined as a portion of the screen representing some data. A "data field" is defined as a representation of data in memory or in some other storage medium such as a disk.

A "card" is defined as a collection of data fields in memory or on disk. As will be described further in conjunction with FIG. 2A, each card may include a visible field portion and a hidden field portion. The data fields on a particular card may correspond to text, icons, equations or numbers. The data fields on a particular card may also correspond to instructions or commands such as display data, skip the next card, etc.

A "stack" is defined as a plurality of cards which are arranged in a predetermined order. An "icon" is generally defined as a pictorial image which is displayed on the monitor 22 and which represents a data field. A "script" is defined as a plurality of processor instructions which are stored on a card and are available to be executed by the processor 12 (FIG. 1).

The phrase "data structure" refers to the arrangement of data in the speech pronunciation system 10. For example, the arrangement of the screen fields on the screen may be referred to as a data structure.

Those of ordinary skill in the art will recognize, of course, that the term card as described hereinabove may correspond to a file in a Disk Operating System (DOS) programming environment and a stack may correspond to a set of files in the DOS environment.

The terms "user", "student" and "client" may each be used herein to describe a person who is utilizing the system 10 to improve their pronunciation in a particular language.

The terms "clinician", "teacher" and "instructor" may each be used to describe a person who is providing guidance to a user utilizing the speech pronunciation system 10. The instructor may at certain times utilize features of the speech pronunciation system 10 to assist the user.

The term "enhanced monitoring" may be used herein to describe the overall process of (1) separation of speaking from hearing one's own speech with (2) minimal delay and (3) the immediate availability of the model pronunciation for comparison with the self-recorded pronunciation and (4) maximal user control with (5) concentration on pronunciation tasks alone.

In the psycholinguistic literature on monitoring during speech production by native speakers of a language, the models are quite diverse; however, each of the models emphasize processes that occur before the speaker has time to hear their own speech. Evidence provided by the frequencies and timing of different types of repairs in spontaneous speech indicates that there are several monitoring processes. Most monitoring occurs before utterances are produced, with so-called repairs sometimes being planned even as the faulty utterance is being said. Repairs in spontaneous speech by native speakers typically relate to the generation of ideas, not the formulation of speech plans. The use of hearing to monitor one's own speech for errors is optional, and depends on other attentional demands. Thus, training in self-monitoring for non-native speakers places a somewhat unnatural demand on the speaker.

In non-native speakers, attentional demands are very high during the process of speaking, as speaking is not normally so highly automaticized as in native speakers. This means that the use of hearing to detect and correct errors will not normally be possible in conversational contexts. Pre-speech monitoring is normally focused on ideational content or partially automaticized syntactic rules. As a result, discrepancies between realized pronunciation and target pronunciation, are seldom noticed. An additional problem with the use of normal monitoring to detect problems is that a non-native speaker may be aiming for a target pronunciation which is in fact erroneous. The widespread occurrence of fossilized pronunciation in adult non-native speakers bears witness to the fact that normal monitoring processes are inadequate as tools for gradual improvement in articulation once one is immersed in a new linguistic environment.

In order for non-native speakers to reliably notice articulation errors in their speech, and to begin to correct them, the monitoring process should be artificially reconstructed to optimize all of the features which facilitate observation of errors. Most important, the act of speaking should preferably be separated from the act of hearing one's own speech. Thus, the attentional load related to speech production will not be present at the time of listening.

The present invention provides the user with the capability of playing a model sound stored in memory via the speech processor and the audio output device, imitating the model sound, recording their own imitation of the model sound and hearing both model and their imitation immediately afterwards. After the user completes an utterance, the system 10 allows the user to hear a self-recording within a predetermined period of time. It may be desirable for the delay between speaking and then hearing one's own speech to be relatively short in order to maintain a link between the decaying material in short term memory and the new auditory stimulus, which is the self-recording. However, other time delays may provide optimum results based on a variety of factors including the characteristics of a particular user.

The user may enhance error detection, that is enhance the detection of faulty word phrase or sentence pronunciation, by comparing a self-recorded imitation to the model without delay. This technique avoids the problem of erroneous targets so long as the learner may adequately perceive the modelled target pronunciation. Hearing the model in comparison with the self-recording forces the user to notice discrepancies, and to begin to reconstruct the user's own phonological model if it is inappropriate. Thus, this comparison frequently results in immediate spontaneous self-corrections.

In order to maximize attention to details of pronunciation, rather than to ideational content or syntax, the task for the user in the present invention is confined to imitation of pronunciation, and avoids the traditional multi-tasked context which includes substitution of new words within syntactic frames. This deliberate decontextualization, which is at odds with so-called English as a Second Language theory, creates a situation where the learner's attention is not distracted from pronunciation to other factors which are normally and appropriately more important in language use.

The provision of user control over the number of repetitions in listening to and recording imitations of a model is important in maintaining motivation. The same applies to user control of branching to more detailed information, and sequencing of material. User control over the system allows a user to employ their own learning strategies, provides active learning, and provides optimum use of the user's time.

In the HyperCard TM programming environment, a Macintosh TM desktop screen displays an icon representing a program to be executed. To execute one of a variety of programs, the appropriate icon on the Macintosh TM desktop screen representing the desired program is selected by the user and the HyperCard TM environment causes the program to be executed by the processor 12. Once the instructions begin to execute, the user has the ability to use any of the program options provided by the selected program such as the program which provides the interactive speech pronunciation system 10. The user may also return to the Macintosh TM desktop screen by simply selecting the appropriate icon shown on the screen which is displayed on the monitor 22.

Program Stacks

Figure 2:
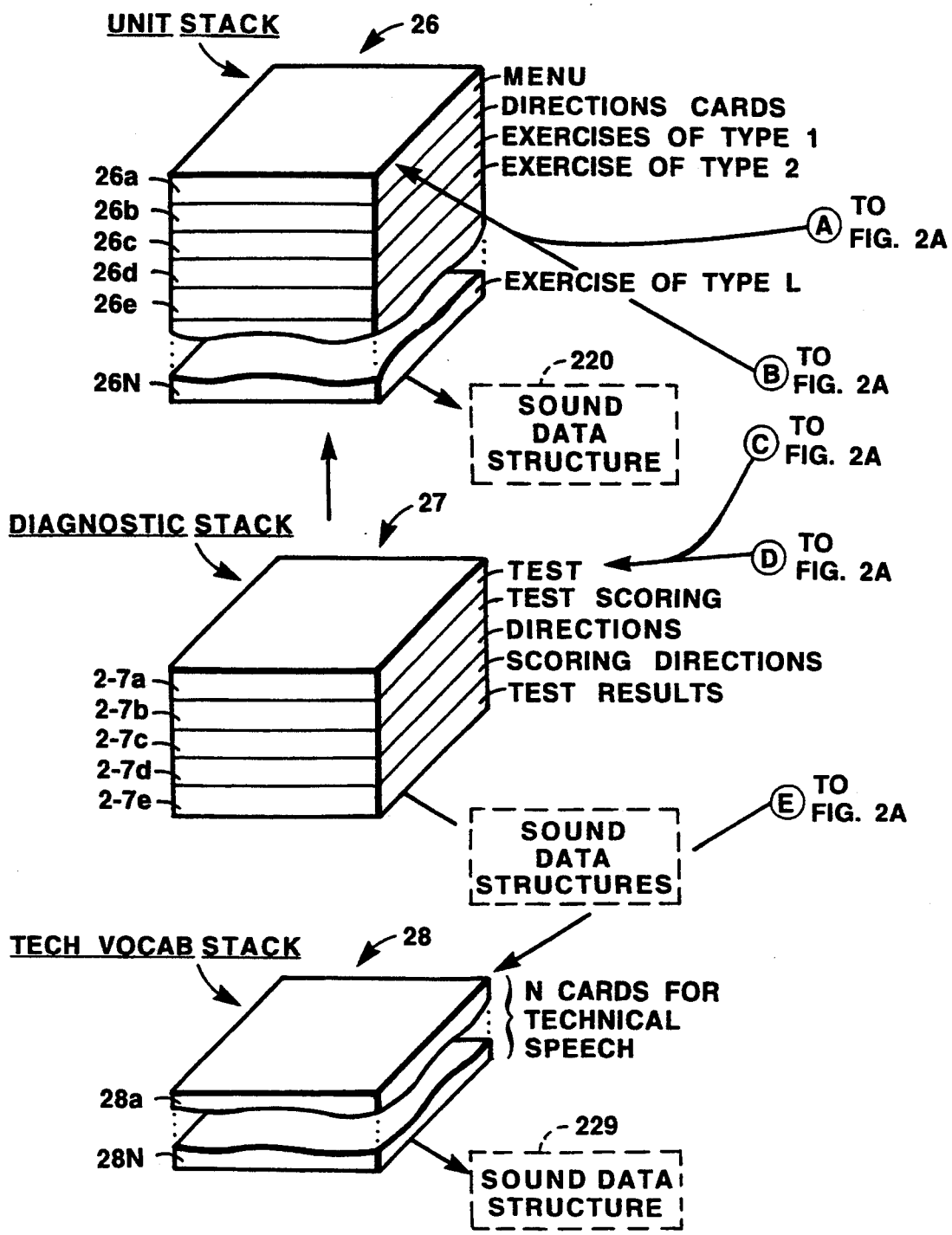
FIGS. 2–2B are a series of pictorial representations of a plurality of program stacks used in the language learning system of FIG. 1.

Referring now to FIGS. 2-2B, the interactive computer system 10 includes a plurality of stacks. To more clearly understand the speech pronunciation system 10, each of the stacks are here illustrated as a plurality of cards having data or scripts stored thereon. Here one possible order of the cards in each of the stacks is described. The cards may, of course, be ordered differently in which case pointers to the cards and relevant script would be accordingly modified.

Referring briefly to FIG. 2C, an exemplary card 217 is shown to include a visible field portion 218 and a hidden field portion 220. The visible field portion 218 of the card 217 is mapped to a screen field 222 which is displayed on a screen 224 on the monitor 20 (FIG. 1). Depending upon the function of the card, all, some or none of the data on a particular card may be displayed on the monitor 20. That is, each card may have stored thereon only data fields, only screen fields or a combination of screen and data fields.

Referring again to FIGS. 2-2B, it should be noted that the arrangement of data on each of the screens to be described hereinbelow is merely exemplary and those of ordinary skill in the art will recognize that other arrangements may also be used.

Before describing the stacks, it should be noted that in addition to the screen fields which may be displayed on each screen, each screen may also have displayed thereon a series of control or navigational icons which permit the user to control instruction execution. The function of a control icon is determined in part by the context or screen in which it is displayed. It should also be noted that each control icon may affect the data structures and instruction flow of the system and the action initiated by each icon may be determined in part by the context in the screen in which it is associated. It should be appreciated that text selectors may be employed for control instead of control icons when a graphical user interface 19 is not employed.

The overall organization of the program stacks will now be described. Two basic principles used in designing the stacks have been to minimize training time required for a first time user of the interactive speech pronunciation system 10 and to allow user control of sequence and timing of the system steps. The present embodiment includes a plurality of interlinked HyperCard TM Stacks, which are used in conjunction with a Macintosh TM computer.

A home record 22, here shown in phantom, includes a set of icons which correspond to programs having lists of instruction sets which are executable by a user. The home record 22 is displayed on the monitor 22 as a home screen 23. In the Macintosh TM computer system, the home screen corresponds to a Macintosh TM desktop screen. An icon 23a on the home screen 23 points to a Main Menu Stack 24 of the speech pronunciation system 10.

The Main Menu Stack 24 includes a plurality of cards 24a through 24N. Each of the cards 24a through 24N have a corresponding function and may include pointers which designate other stacks of the speech pronunciation system 10. Here, cards 24a through 24e correspond to help files which provide information and other guidance.

In particular, card 24a provides a Main Menu screen and includes pointers to the other stacks. Cards 24f and 24g each contain a Table of Contents Lesson Menu screen which has pointers to a Unit Lesson Stack 26 and the Diagnostic Stack 27. The Unit Lesson Stack 26 and Diagnostic Stack 27 will each be described below. It should be noted however that here a single Unit Lesson Stack is shown, but as will be described below there may exist more than one Unit Lesson Stack 26 and the cards 24f and 24g will have a corresponding pointer to each of the plurality of Unit Lesson Stacks.

Card 24h provides a Technical Vocabulary Menu screen and a pointer to a Technical Vocabulary Stack 28 and card 24i provides a Directions screen which provides directions for use of the Technical Vocabulary Stack 28. Card 24j provides a menu screen for a Native Languages Menu. The Main Menu Stack 24 also includes a plurality of cards 24k through 24N each of which correspond to a native language which appears on the Native Language Menu screen provided by card 24j. Thus if, for example, the Language Menu screen lists ten languages then the Main Menu Stack 24 would include ten corresponding language cards. Each of the language cards has a pointer which points to a single Diagnostic Stack 27 and a pointer which points to the Unit Stack 26.

Also associated with the Main Menu Stack 24 is a sound data structure in which digitized representations of sounds used in the Main Menu Stack 24 may be stored. Here, cards 24c–24e include pointers to the sound data structure 210.

The Sample Stack 212 is provided for individual user's personal records and for saved sounds and here includes a card 212a which corresponds to a sound list. The sound list 212a includes a pointer to a sound data structure 214. Cards 212b and 212c correspond to directions screens which may be displayed on monitor 22. Card 212d corresponds to a lesson plan generated in response to a diagnostic test used to evaluate the user. Card 212e corresponds to personalized drills for a user and card 212f corresponds to session notes which may be used in conjunction with a tracking option of the system which will be described in conjunction with FIGS. 9–9B.

The Sample Stack 212 is provided for an individual user's personal records. Thus, as will be further explained below, a Sample Stack is provided for each user.

The Sample Stack 212 is a template from which a file, generally referred to as a Personal Stack, for each of the users may be made. To provide a user with a Personal Stack, the Sample Stack template 212 is simply copied and given a name which may, for example, correspond to the user's three initials. Once the Personal Stack has been named, the user may access it by typing in the corresponding name. This may be done for each user of the system 10. Thus, if there are ten users of the system 10, for example, then there may exist ten corresponding Personal Stacks. Here, only a single Personal Stack 212' is shown.

In the sound data structure 214, digitized utterances of the user may be stored to record progress, difficult vocabulary items of special importance to which the user has recorded may be stored (for example the name of a specialized field of work in which the user may be occupied, or specialized vocabulary containing problem sounds for the particular user). Sound List card 212a includes pointers which allow access to the user's digitized utterances and Personalized Drill card 212e provided a screen which allows the instructor to record different sounds and also includes pointers to the sound data structure 214. Session information may be noted and stored on card 212f. The Sample Stack 212 and more particularly the Personal Stack 212' duplicated from the Sample Stack 212 is provided for storing sounds and text which the user desires to save.

During a teaching session The clinician may store digitized samples of incorrect and correct utterances spoken by the client immediately after the utterances are produced without interrupting the flow of the teaching session. A major problem in estimating progress of non-native speakers of English, for example, is that over a period of time, the clinician adapts to the articulatory patterns of the client. Thus, the client appears more intelligible to the clinician.

In the present invention, however, the instructor may listen to the stored utterances of the user and compare the user's past utterances to the user's present utterances of the same word. The instructor is therefore provided with an objective method of assessing the percentage of word segments correctly articulated each session. Furthermore, the stored utterances of the user may also be judged by another instructor or subjected to scrutiny using a speech analysis program. A further advantage of the present invention is that use of the Personal Stack 212' for storage of sound samples reduces record keeping done on paper by the clinician during the teaching session and thus allows the instructor to focus exclusively on working with the user. A still further advantage provided by the Personal Stack 212' is that sounds which have been recorded and saved in the user's Personal Stack 212' may be played back to the client to demonstrate the client's improvement.

As mentioned above, the Main Menu Stack 24 includes pointers which point to the Unit Stack 26. The Unit Stack 26 corresponds to a speech pronunciation lesson generally referred to as a lesson unit and includes a plurality of cards 26a through 26N. Cards 26a and 26b respectively correspond to a Lesson Unit Menu screen and a Directions screen. Each of the cards 26c through 26N correspond to a series of speech exercises which may be used by the clients during their sessions. Each of the cards 26c through 26N may also include pointers to a sound data structure 220.

Those of ordinary skill in the art will recognize that if it is desirable to provide the speech pronunciation system 10 having more than one lesson unit then there will be a corresponding increase in the number of Unit Stacks 26. For example, one preferred embodiment includes twenty-four lesson units and thus includes twenty-four Unit Stacks (i.e. "Unit 1" to "Unit 24").

Each of the lesson units 26 may be provided having similar structures, thus a typical unit will be described herein. Each lesson unit has several lesson parts (typically three), with each lesson part typically emphasizing a particular sound or combination of sounds. An opening screen provides rationale and general information about the set of sounds to be studied by the user. In some cases an introductory exercise may also be provided. The lesson parts may be accessed through icons on the opening screen.

In each part of the lesson, a progressively more difficult series of preorganized and presequenced exercises in using the sounds under study are provided to the user. Each of the exercise cards 26c–26N includes a pointer which points to the next sequenced exercise lesson unit. Thus, when an exercise screen is displayed on the monitor for example, the next exercise may be reached by selecting a "NEXT" icon.

When an exercise is completed, the user then has the option of starting another exercise in the lesson unit 26 or quitting the lesson unit. When the user has completed a final part of the lesson unit 26 on the card 26N for example, the system presents a list of options to the user. For example, the user may review the lesson unit 26 (i.e., select an icon leading to the first screen of the lesson unit 26) or the user may go to the Main Menu Stack 24.

The screens of the lesson unit 26 may be organized according to the exercise type. For example, similar exercises may be grouped together. The structure of a series of drills will be described in detail hereinbelow in conjunction with FIGS. 6A–6E to show the structure of some of the screens used in the drills.

The Diagnostic Stack 27 includes a plurality of cards 27a through 27e. Card 27a corresponds to a screen which displays a diagnostic test and card 27b corresponds to a screen for test scoring. Cards 27c and 27d each provide a directions screen and card 27e provides a screen showing test results of the diagnostic test. The screens and program flow of Diagnostic Stack 27 will be further described in conjunction with FIGS. 8–8B.

The Technical Vocabulary (TechVocab) Stack 28 includes a plurality of cards 28a through 28N with each of the cards corresponding to technical vocabulary from different professions. Each of the cards 28a through 28N includes a pointer to a corresponding sound data structure 29.

The TechVocab Stack 28 allows users to practice vocabulary from their own professions (if listed) or words of general professional or scientific interest and thus is an adjunct to the main lessons stored in the Unit Stack 26. The words stored in the stack may be selected according to frequency of use and difficulty of pronunciation by non-native speakers.

Words in the TechVocab Stack 28 may be organized in a variety of ways depending upon a variety of factors. For example, stressing the incorrect syllable or other part of a word may have a negative effect on the intelligibility of the speaker. Thus, in the TechVocab Stack 28, the words may be organized by stress-group.

That is, words with a similar pattern of stressed and unstressed syllables may be listed together. Similarly words and phrases may also have stress patterns. Thus, lists of phrases and sentences having like patterns of stress may also be provided. Thus, the TechVocab Stack may be used to practice stress patterns in English or in any other language as well as professional vocabulary in English of any other language.

The TechVocab Stack 28 may be organized as a homogeneous stack having a single background while all of the other stacks described herein may be provided as heterogeneous stacks with multiple backgrounds. The words for individual professions may thus be entered into background fields.

A Clinician Stack 216 includes a card 216a having a pointer and a screen which has an index of a clinician's clients provided thereon. Card 216b provides a screen having directions to the clinician thereon. The Clinician Stack 216 further includes cards 216c through 216N which each correspond to a client of the clinician. The clinician may enter session information to the system 10 and such information may be stored on the client cards 216c through 216n. Thus, if the clinician desires to have ten clients entered in the Clinician Stack then there will exist a corresponding card for each of the ten clients. The index card 216a includes a pointer to each of the client cards to thus allow the clinician to access the client cards 216c through 216N.

The Clinician Stack 216 is intended for use by the instructor (e.g. a speech-language pathologist) who utilizes the system 10 with their accent-reduction clients. Thus, several features of the Clinician Stack differ from those features in the stacks described above.

First, the Clinician Stack is not directly accessible from the Main Menu Stack. Thus an additional amount of privacy is provided to the instructor. Second, the clinician is given instructions to use HyperCard TM keyboard commands to create new screens, print screens, etc. The user, on the other hand, is not requested to do anything other than speak, listen, and select icons. Third, the features of the Clinician Stack 216 reflect the need for documentation of progress in the profession of speech-language pathology. For example, the Clinician Stack provides a tracking option to the clinician. The tracking option allows the instructor to use the keyboard to maintain a record of whether a client's imitations of a model utterance in the Lesson Units are correct or not. The instructor may also monitor other aspects of the client's progress and independently save utterance recordings made by the client.

The default option is for the tracking feature to be turned off. Thus, the tracking option is turned off until the clinician or another user of the system selects the appropriate box(es) in the Clinician Stack to turn the tracking option on. Subsequently, the tracking option remains on for each users session until the option is turned off by the clinician or another user of the system.

To implement the tracking option, scripts and cards are provided in four of the above described stacks. As mentioned above and as will be described in conjunction with FIGS. 11, 11A below, the Clinician Stack includes icons used to turn the tracking feature on or off. The Main Menu Stack 24 includes cards having two hidden fields which contain the information as to whether the tracking option is turned on or off. The information in the hidden fields of the cards in the Main Menu Stack is read whenever the menu is used. Cards in the Lesson Unit Stacks include scripts which identify particular keystrokes, increment appropriate variables, and calculate and store the tallies. A Session Notes card in the user's Personal Stack 212', includes its own Directions card. The results of the tallies are stored in a data field of the Session Notes card.

The scripts of one of the icons which turns tracking on and off determines if a box is checked or not, and sets a logical indicator (e.g. "true" or "false") accordingly in a hidden field on the Main Menu card 24a.

The relevant script in the Main Menu card 24a of the Main Menu Stack 24 reads whether the tracking options are on or off and stores the values into variables that may be used throughout the session when needed. The script in the Main Menu card 24a also sets the tally variables to zero. The relevant script on a drill card in the Unit Stack 26 identifies particular keystrokes and may for example make a simple tally of how many strokes of a particular letter have been made.

When the client finishes using a particular screen, the clinician may enter an "f," from a keyboard to activate the calculation of the totals, which are placed in the user's Personal Stack. The "f" key also resets the tallies to 0 in preparation for work on the next problem. If the number of correct and incorrect judgments doesn't sum to the total number expected for the card, the procedure is aborted to help avoid meaningless statistics.

In the user's Personal Stack 212' information such as the date, a brief description of the problem under study (e.g. "words ending with a final d sound") the percentage of correct utterances on first attempt, the percentage of correct utterances after working on the problem, and the number of spontaneous self-corrections (if that feature is turned on) is stored. Thus, the user's Personal Stack 212' simply receives the information collected during the client's speech session.

A last section of the drill card script duplicates the function of the SAVE icon to be described below. It should be noted however, that the drill card script which duplicates the function of the SAVE icon also provides the clinician with control of the save feature by allowing the clinician to save a recorded sound by pressing a particular key. A sample screen from the Clinician Stack 216 will be described in conjunction with FIG. 11A.

System Flow

The screens and flow between and within each of the stacks will now be described in detail hereinbelow in conjunction with FIGS. 3-10.

Figure 4:
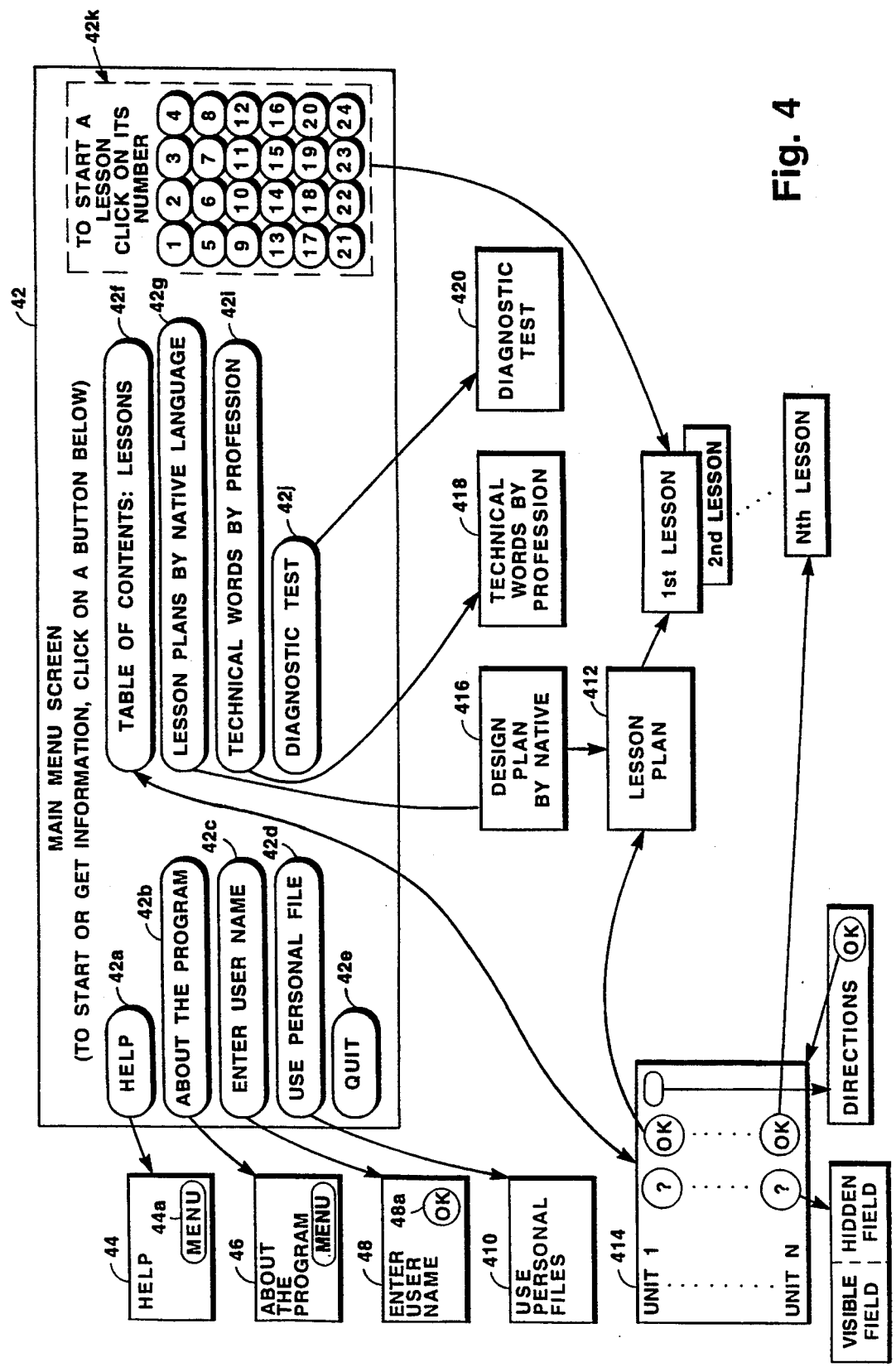
FIG. 4 is a flow type diagram showing graphical illustrations of a plurality of screens available from the Main Menu screen.

Referring now to FIGS. 3 and 4, a high level flow chart type diagram of the system options presented to a user upon start up of the interactive speech pronunciation system 10 is shown. FIG. 4 provides a graphical illustration of screens provided from the stacks described in conjunction with FIGS. 2-2B which correspond to each of the options provided by the system 10. The options provided to the user in the preferred embodiment in effect constitute an audiovisual user interface with which the user may interact in order to learn how to correctly articulate words in a particular language.

Upon starting the system 10 as shown in step 32, a Main Menu screen 42 (FIG. 4) is displayed on the monitor 22 (FIG. 1). As shown in step 34 the user may select one of a plurality of program options 42a-42k form the Main Menu screen 42. Each of the program options 42a-42k will be described further below. Suffice it here to say that from the Main Menu screen 42 the user may select any one of the here ten different program options provided on the Main Menu screen 42. In the present invention, the program options include QUIT, HELP, ABOUT_THE_SYSTEM, ENTER_USER_NAME, USE_PERSONAL_FILE, START_A_LESSON, TABLE_OF_CONTENTS, LESSON_PLAN_BY_NATIVE_LANGUAGE, TECHNICAL_WORDS_BY_PROFESSION, and DIAGNOSTIC_TEST. In a preferred embodiment, the user uses the GUI 19 (FIG. 1) to select one of the ten program options.

As shown in steps 36 and 38 selection of the QUIT option 42e causes the interactive pronunciation learning functions provided by the preferred embodiment to terminate execution. Thus, if the user selects the QUIT option 42e, the processor 12 (FIG. 1) terminates execution of the program steps of the present invention and executes program steps to display the home screen 23 on the monitor 20.

Otherwise, as shown in steps 310 through 326 the user may select one of the nine remaining options. After selecting any of the nine remaining options, it is possible to again return to the display of the Main Menu. Thus, from the Main Menu screen 42, which is displayed on the monitor 22 (FIG. 1), the user is permitted to select between ten different options in the preferred embodiment. Those of skill in the art however will recognize that any number of options may be used with the system 10.

If the user selects the HELP option 310 a Help screen 44 (FIG. 4) appears on the monitor 22 which provides a short explanation of the help which is available. Icons 44b-44N on the screen 44 give access to such help. As will be explained further below, most help is provided contextually rather than in a general help section.

If the user selects the ABOUT_THE_SYSTEM option 312, this option accesses a screen 46 (FIG. 4) which provides a brief description of the system 10.

The ENTER_USER_NAME option 314 causes a message box (not shown) to be displayed on the monitor 22 (FIG. 1). The message box includes text which requests the user to type the three initials of their name using the keyboard. This is the only keyboard use required of the user. The user name need only be entered once in a session, and may be entered by the teacher prior to beginning the session if it was desirable to entirely avoid keyboard use by the user. The user's initials may be entered using upper letters, lower case letters, or a combination of upper and lower case letters. Entering the user's initials allows access to the user's Personal File. It should be noted, however, that entering the user name at this point is optional. After the user's initials have been entered, the user need only select the OK icon 48a (FIG. 4) to enter the information or alternatively, if the user does not wish to enter initials, a CANCEL icon (not shown) may be selected in which case the initials are not entered.

If at any point the user attempts to execute a system function which accesses the user's Personal Stack 212' (e.g. permanently saving a recording, or saving the result of a diagnostic test, or selecting the USE_PERSONAL_FILE icon on the menu) and the name of the Personal Stack 212' has not yet been entered, the same dialog box mentioned above appears on the monitor and the user may then enter a name or an identification number for the Personal Stack 212'.

The user may return to the Main Menu screen 42 from the screens 44 through 420 by selecting a MENU icon provided in at least one screen of each of the program option screens. As shown in FIG. 4, the MAIN_MENU icon 44a is exemplified in the HELP screen 44.

Turning now to FIG. 4, upon starting the system 10, an exemplary illustration of the Main Menu screen 42 is shown. The Main Menu screen 42 is shown with icons 42a-42k representing the system options 34 and 310 through 326 described in conjunction with FIG. 3 above provided thereon.

As mentioned above, the user may select an option from one of the plurality of options shown on the Main Menu screen 42 using the GUI 20 to select the icon corresponding to the desired program option. When one of the icons 42a through 42k is selected a corresponding pointer initiates execution of the appropriate program option.

Use Personal File Option

Figure 5A:
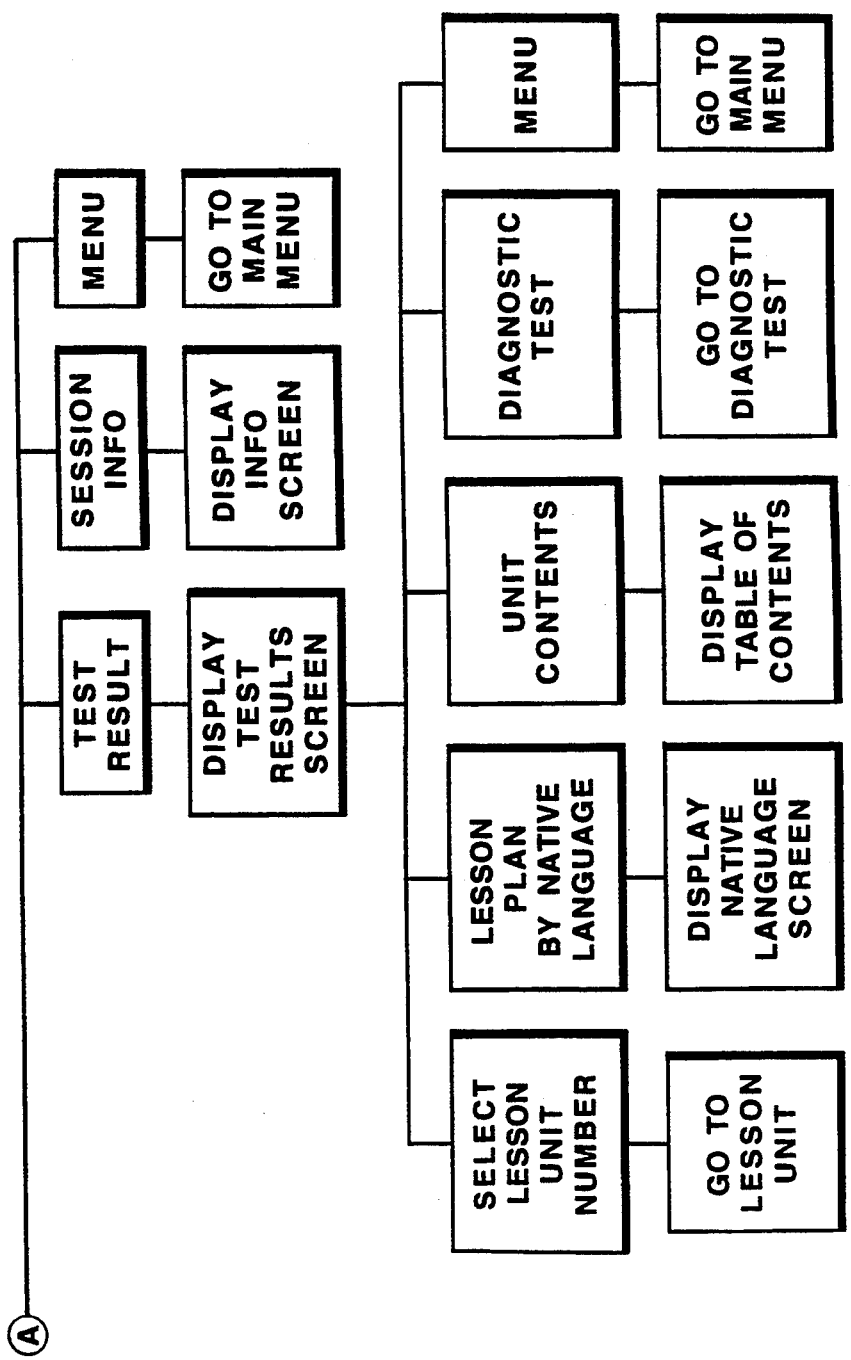

Referring now to FIGS. 5 and 5A an exemplary, simplified flow type diagram illustrating the program options available in a user's Personal Stack 212' is shown.

Referring now to FIGS. 5B through 5E, when the USE_PERSONAL_FILE icon 42d from the Main Menu screen 42 is selected, the Use Personal File Option 416 (FIG. 4) is accessed. The USE_PERSONAL_FILE icon 42d includes a pointer to the card 212a' in the Personal Stack 212' and a Recorded Sounds screen 510 (graphically illustrated in FIG. 5A) of the user's Personal Stack 212' is displayed on the monitor 20. If the user initials have not been entered when Use Personal File option 416 (FIG. 4) is selected, a dialog box (not shown) is generated and appears on the monitor 22 to prompt the user to name a personal file by entering their initials. The Recorded Sounds screen 510 includes a GO_BACK icon 516.

The GO_BACK icon 516 includes script which sends program control back to the last card in the last stack accessed by the user. Thus, for example, if the user were in a card of the Unit Stack 26 and accessed the Personal Stack 212', the GO_BACK icon 516 would return the user to the card in the unit stack which the user had last accessed.

It should be noted that separate stacks stored in a memory and not an integral part of the speech pronunciation system 10 may nevertheless access and be accessed by the system 10. For example, one embodiment of the present invention includes 24 Unit Stacks which may be accessed through icons provided on the Main Menu screen 42. Thus these stacks are considered an integral part of the speech pronunciation system. An peripheral twenty-fifth stack, however, may be stored on the memory.

Although the twenty-fifth stack may not be accessible from the Main Menu screen 42, and therefore not an integral part of the speech pronunciation system 10, the twenty-fifth stack may nevertheless be operable in the Hypercard programming environment. From such a peripheral stack the user may access the Personal Stack 212' of the speech pronunciation system 10. Furthermore, using the GO_BACK icon 516 the user may access the peripheral twenty-fifth stack from the Personal Stack 212' which is an integral part of the speech pronunciation system 10.

Referring now to FIG. 5B, the Recorded Sounds screen 510 for playing recorded sounds is shown. During the exercises, the user may choose to permanently save a recording which they have made by selecting a SAVE icon which will be described in conjunction with FIG. 6. The speech-language pathologist may also permanently save a sound by pressing a key on the keyboard while the client is working using the GUI.

The sounds which are to be saved are named by the system with the name being based on the last model sound played, the date, and a random number. When the user's Personal Stack 212' is accessed, all of the sounds saved by the user or speech-language pathologist are listed in a corresponding one of the blank spaces 511. The user may listen to each of the sounds by selecting the "P" icon 512 disposed beside the corresponding sound name. A DIRECTIONS icon 514, when selected points to the directions card 212b' which causes text to be displayed on the monitor 20. The text which is displayed explains how to use the Recorded Sounds screen 510.

The saved sounds may be used to record progress, to keep track of work done in a single session, to review, or to act as models of correct pronunciation by the user of the difficult sounds.

As mentioned above, the user may return to the work in progress, that is may return to a lesson unit for example, by selecting the GO_BACK icon 516 which causes the last screen used in the lesson unit which the user had last accessed to be displayed on the monitor 20. The GO_BACK icon 516 may be used even when the user has viewed several other screens in the personal file before deciding to return to the lesson unit. A PERSONALIZED_DRILL icon 518 points to a Personalized Drill screen 526 which will be described below in conjunction with FIG. 5C. A TEST_RESULTS icon 520 points to a Test Results screen which will be described in conjunction with FIG. 5D below. The SESSION_INFO icon 522 points to a Session Info screen which will be described in conjunction with FIG. 5E below and the MENU icon 524 points to the Main Menu screen 42 and causes the Main Menu screen to be displayed on the monitor 22.

Figure 5C:
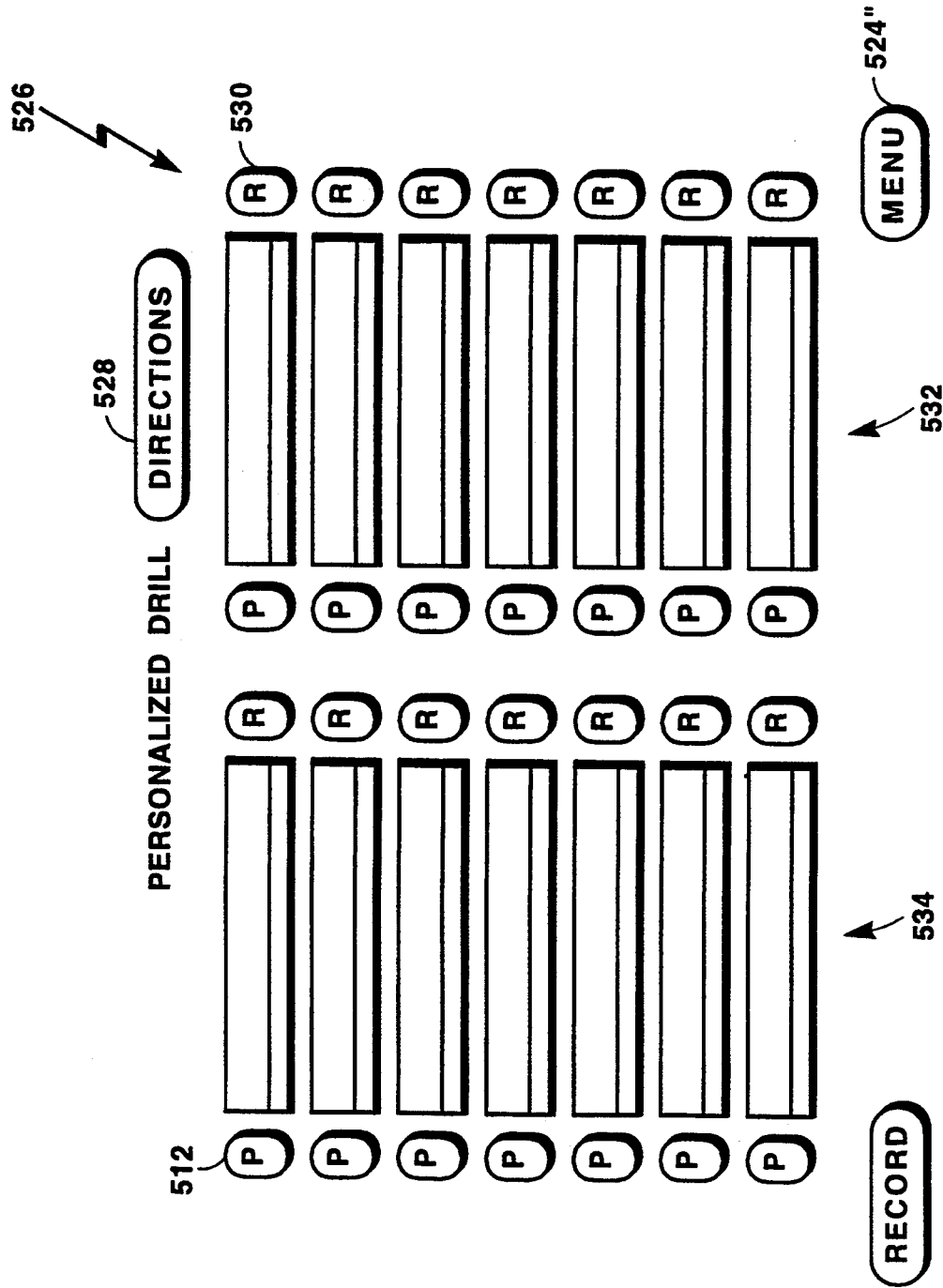

FIG. 5C illustrates the Personalized Drill screen 526. A DIRECTIONS icon 528 points to the directions card 212b (FIG. 2A) which provides a Directions screen (not shown) when selected. Phrases or sentences of importance to the user may be recorded by a speech pathologist, for example, and stored on the Personalized Drill card 212e which corresponds to the Personalized Drill screen 526. Text corresponding to the recorded sound may later be viewed on the Personalized Drill screen 526. The user may later access the stored sound and thus later practice the stored phrases or sentences.

The screen 526 allows the user to practice vocabulary of personal interest in the same way that the exercises are practiced in the Lesson Units. The words to be recorded may be habitual phrases that the user finds are often not understood, or words, such as technical words, which are frequently spoken by the user and which are difficult for the user to pronounce. The native speaker (e.g. speech-language pathologist or instructor or other person) may type the word in one of the boxes shown, and then record the word by selecting a corresponding one of the "R" icons generally denoted 530. The instructor then has a predetermined period of time in which to speak the word into the audio input/output device 24 (FIG. 1). The word or phrase may then be played using the corresponding "P" icon 512. The word or phrase may be used as a model to be imitated by a student as in the Lesson Units.

If the instructor is not satisfied with the recording made of the word or phrase, the instructor may rerecord the word or phrase by selecting the corresponding "R" icon 530 again. The longer boxes 532 are associated with longer recording times, and thus may be used for phrases while the shorter boxes 534 are associated with shorter recording times for words. Once the words or phrases stored in the boxes 532 and 534 have been studied, the boxes 532 may be reused by storing new words or phrases therein.

The MENU icon 524' points to the Main Menu screen 42 (FIG. 4) as described above in conjunction with FIG. 5B.

Figure 5D:
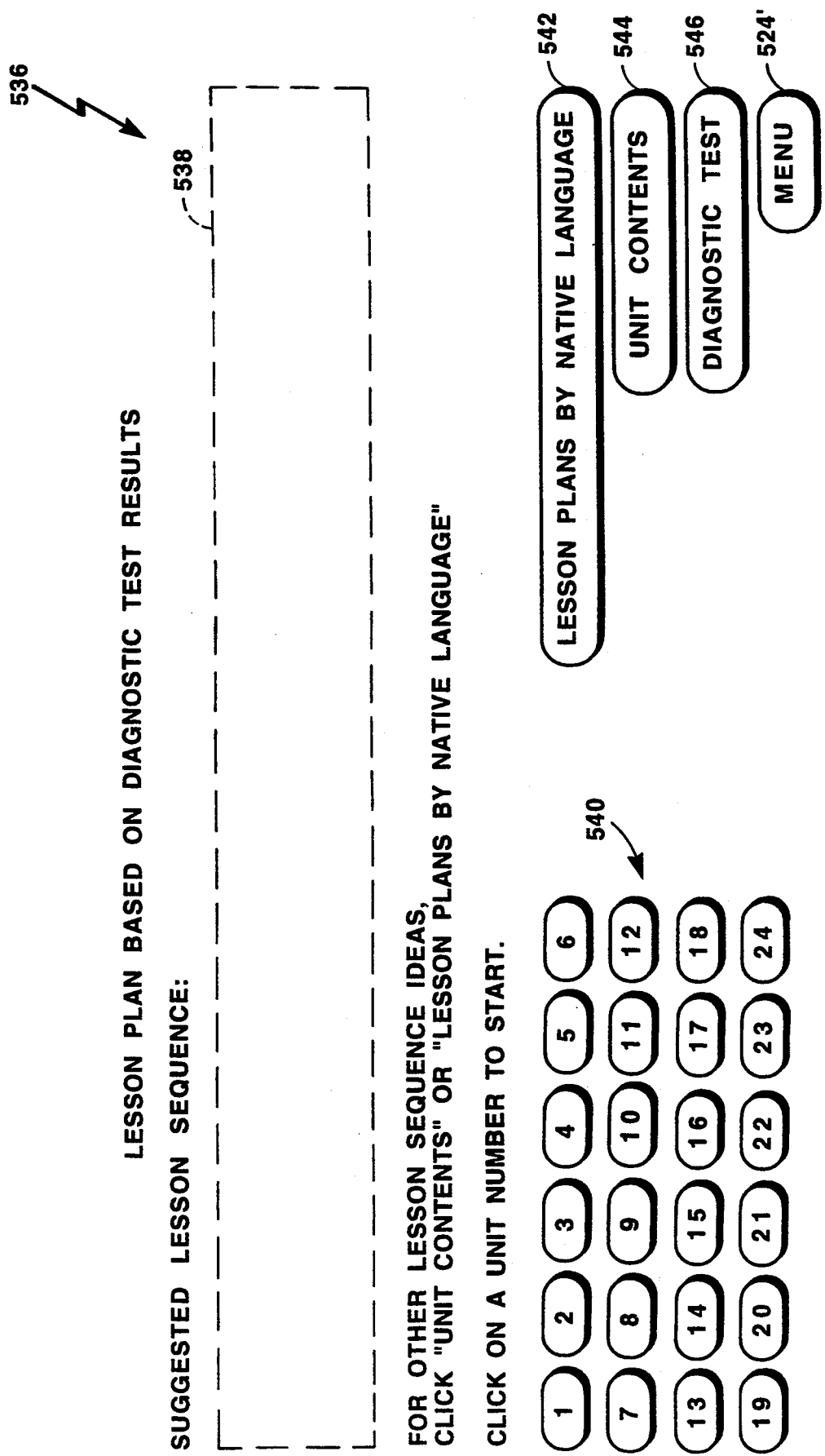

Referring now to FIG. 5D The Lesson Plan Based on Diagnostic Test Results screen 536 in the Personal File is used to store the calculated lesson plan derived from a diagnostic test. The text of the lesson plan is transferred into the empty screen field 538 of this screen of the user's Personal Stack automatically when the lesson plan is calculated in the Diagnostic Test Stack. The actual lessons suggested and displayed in the screen field 538 are derived from the diagnostic test. The user may consult the suggested lesson sequence at the beginning of any session by selecting the PERSONAL_FILE icon 42d on the Main Menu screen 42 and subsequently selecting the TEST_RESULTS icon 520 (FIG. 5B) on the Recorded Sounds screen 510 (FIG. 5B). From the Lesson Plan Based on Diagnostic Test Results screen 536 any lesson may be started by selecting the corresponding lesson number icon from the matrix of lesson number icons 540 shown.

A user may also directly access other lesson sequence planning tools from the Lesson Plan Based on Diagnostic Test Results screen 536 via the LESSON_PLANS_BY_NATIVE_LANGUAGE icon 542, the UNIT CONTENTS icon (Table of Contents screens) 544, and the DIAGNOSTIC_TEST icon 546. The DIAGNOSTIC_TEST icon 546 is provided since a user may access the Lesson Plan Based on Diagnostic Test Results screen 536 before taking the diagnostic test and then the user may subsequently decide to take the diagnostic test. The MENU icon 524" points to the Main Menu screen as described above in conjunction with FIG. 5B.

Figure 5E:
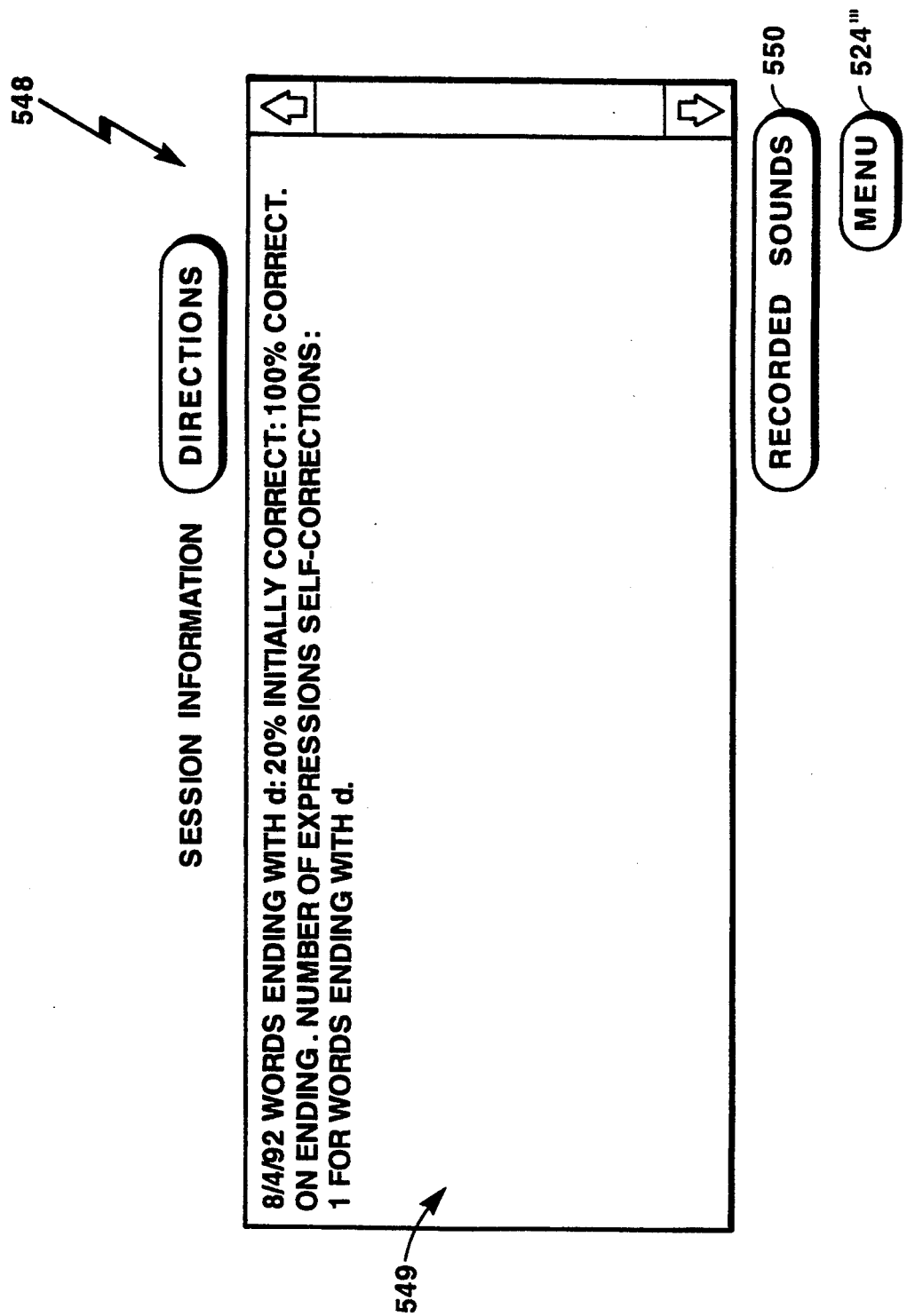

Referring now to FIG. 5E an illustration of the Session Information screen 548 allows the user or speech-language pathologist to type notes if desired in the screen field 549. The screen field 549 is here provided as a scrolling screen field and thus may hold notes over many sessions without running out of space. The Session Information Screen 548 may also include the results from the optional tracking feature.

The RECORDED_SOUNDS icon 550 points to the Recorded Sounds screen 510 (FIG. 5B) used for playing sounds recorded and saved by the user. The MENU icon 524''' points to the Main Menu screen 42 (FIG. 4) as described above in conjunction with FIG. 5B.

Start a Lesson Option

Figure 6:
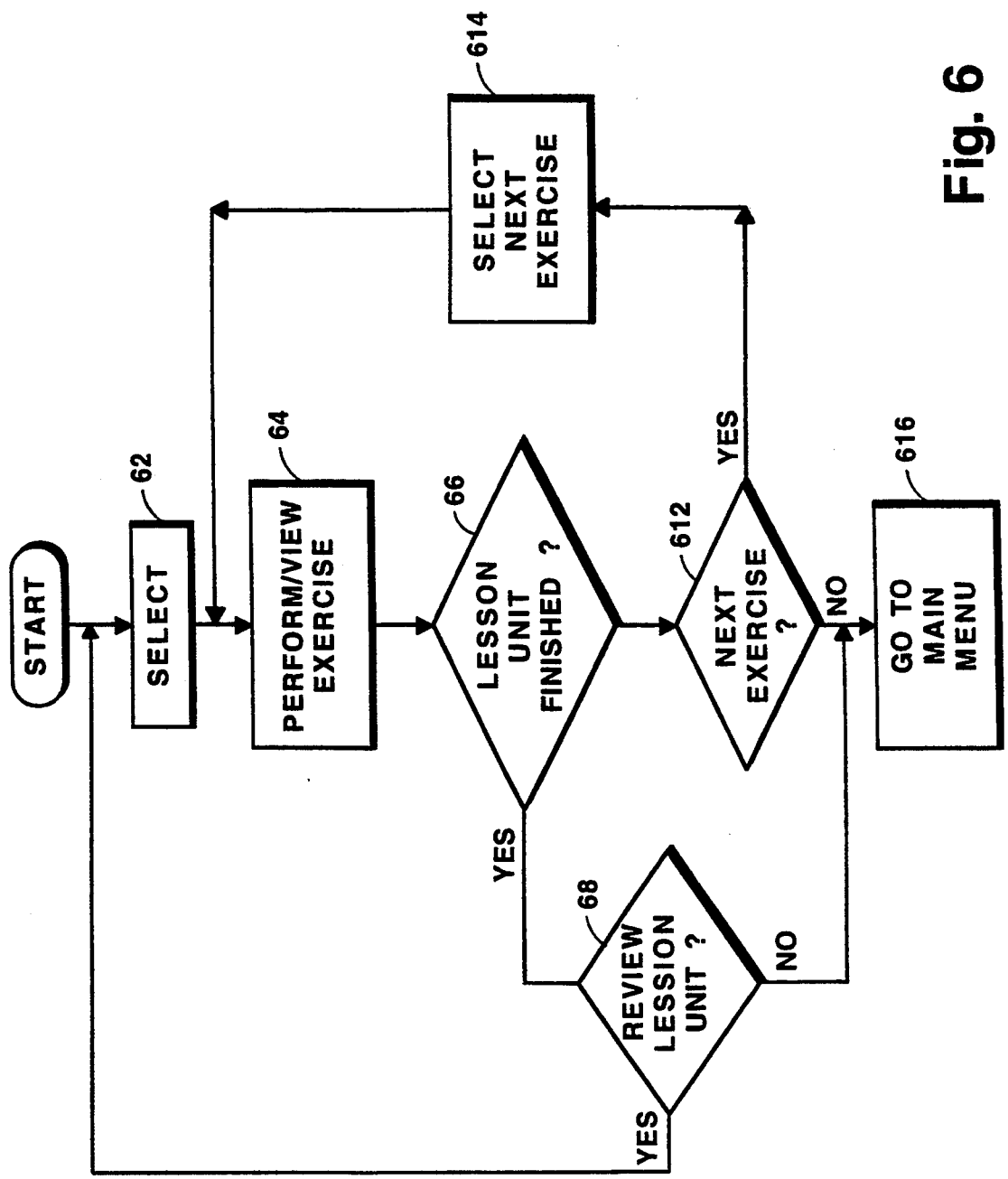
FIG. 6 is a flow type diagram of the program options available from a Unit Lesson Stack.

Referring now to FIG. 6 a simplified flow-type diagram will be used to describe the Start a Lesson Option in general overview. As described herein there are a plurality of ways to start a lesson. For example, as shown in step 62 the user selects, with the GUI 20 for example, a single lesson number icon from the matrix of lesson number icons 42j (FIG. 4) displayed on the Main Menu screen 42 (FIG. 4). As described above each of the icons on the matrix of lesson number icons 42j corresponds to a lesson unit having a plurality of exercises. In step 64 the user may perform the first exercise of the selected unit. If the user has completed each of the exercises in the Unit then as shown in step 66 the user may optionally review the Unit 68, or alternatively if the user has not completed each of the exercises in the unit, the user may perform the next exercise as shown in steps 612 and 614. Alternatively as shown in step 616 the user may return to the Main Menu screen 42 and select another one of the options 44 through 420 via the icons 42a through 42k.

Each of the lesson numbers in the matrix of lesson numbers which provide the matrix of icons generally denoted 42j correspond to a lesson unit stored in a corresponding one of the plurality of Unit Stacks, an exemplary Unit Stack 26 being shown in FIG. 2. Each of the lesson units focus on a particular segmental target. The target is briefly explained, with examples of pragmatic problems that may result from misarticulation. As will be described in conjunction with FIGS. 6A-6C, the user may first work, for example, with the problem of correcting the segment in a single word. The user may then advance through several levels of difficulty until he/she is practicing professional vocabulary in complex phrases as will be described in conjunction with FIGS. 6D and 6E. Listening practice may be provided when needed, to allow the user to be certain that the segment is heard distinctly. The text on each screen is kept to a minimum, and optional explanations are available by selecting icons which appear on the screen.

The lessons include directions for pronunciation of the sounds, word drills using common words in minimal pairs, sentence drills, and drills of professional-/academic vocabulary in multisyllabic words alone and in phrases. Generalization is encouraged through screens which provide social routines for self-recording and memorization, and suggestions for practice in real conversational contexts. Practice with word and sentence stress, intonation, and linking is an integral part of each lesson. The contents of each lesson are carefully constructed to take into account common difficulties, linguistic principles, word frequencies, and cognitive constraints in the planning of speech.

In the typical lesson, the user is presented with many options. The user may (1) obtain directions for using the exercise, (2) listen to individual sounds, or a pair of sounds, or (3) listen to all of the sounds shown on the screen. The user may listen to sounds or record sounds as many times as desired. Additional information is available in pop-up windows or separate screens with OK icons. Examples of such additional material include more detail on tongue position, a listening exercise, an explanation of orthography, a reminder to pronounce a written "d" as a "t," a definition, a note on pragmatics or a note on the formality of two alternate pronunciations. Provision of "textbook" information is minimized to emphasize practice of the sounds and use of phonetic symbols for sounds is avoided. The combination of these features places the learner in control from the first session, and results in active, intense, and enjoyable learning.

Referring now to FIGS. 6A through 6E, a series of illustrative screens for an exemplary lesson unit are shown. Referring first to FIG. 6A, the first screen 620 is called "Clearer Endings." The Clearer Endings screen 620 provides basic information about why that particular Lesson Unit is important, and also provides two preliminary exercises, which are accessed through a VOICING icon 622 and a PAIRS icon 624. The VOICING icon 622 provides an exercise for the user. If the VOICING icon 622 is selected, an information screen (not shown) appears and directs the user to a particular exercise which the user may perform. After viewing the information, the user may optionally perform the exercise and may then return to the Main Lesson Unit menu 620 by selecting another icon on the information screen. Each one of, here, three icons 625a, 625b and 625c lead to a different set of speech drills which the user may perform.

Figure 6B:
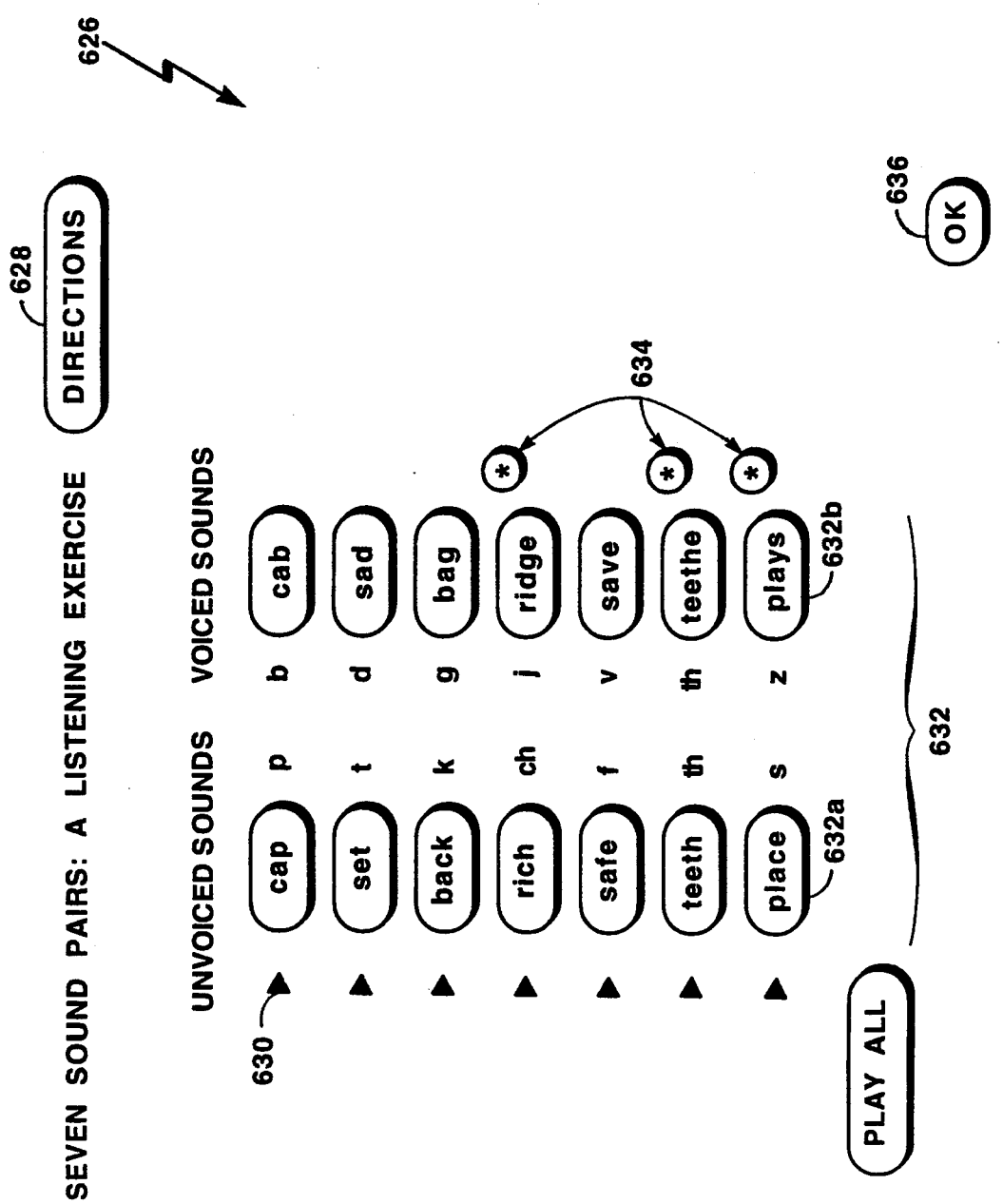

Referring now to FIG. 6B, when the PAIRS icon 624 (FIG. 6A) is selected, a Pairs Exercise screen 626 having a sample listening exercise thereon appears on the monitor 22 as shown. The Pairs Exercise screen 626 includes a DIRECTIONS icon 628 leading to a screen called "Directions for Pairs Exercise" (not shown). In the pairs exercise, the black arrows 630 correspond to icons which will play the pair of words 632. Each of the words may also be played separately by directly selecting the WORD icon 632a or 632b. Additional optional information concerning orthography and meaning appears in windows when the "*" icons 634 are selected. The OK icon 636 leads back to the Main Lesson Unit screen 620.

Figure 6C:
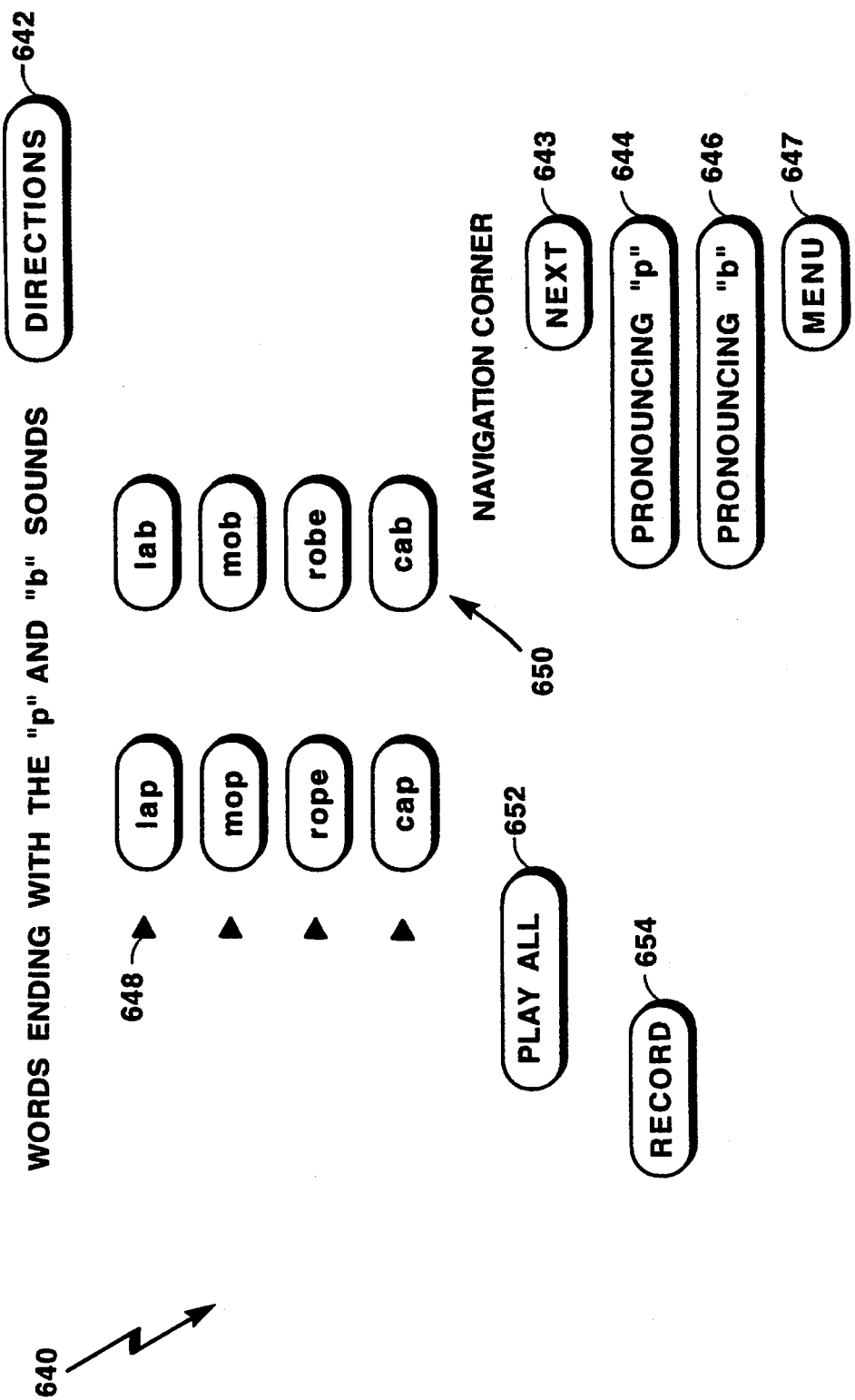

Referring now to FIG. 6C, the "p_and_b" icon 625b (FIG. 6A) leads to here a first screen 640 of the Lesson Unit which corresponds to a so-called a minimal pair drill. In this example, the minimal pair drill is directed toward words ending with the "p" and "b" sounds. A DIRECTIONS icon 642 leads to the display of a directions screen (not shown). A next icon 643 has a pointer which points to the next card in the stack and causes the card to be displayed on the monitor. If users have trouble understanding how a specific sound is pronounced, (e.g., pronouncing "b" on the "b" and "p" screen) the icons 644 and 646 provide optional access to more information screens, which themselves in some lesson units may lead to more optional screens (not shown). In some of the these optional screens, the user may play a sound similar to the voicing exercise described above. Such additional information and sound screens may be provided for example by selecting the "PRONOUNCING_p" and "PRONOUNCING_b" icons 644 and 646.

The rationale for the choice and sequencing of lesson content is beyond the scope of this document. However suffice it here to say that the choice and sequencing of the lesson content is selected according to principles in applied linguistics, speech language pathology, second language pedagogy, communication theory, psycholinguistics and cognitive psychology.

Three minimal pair drills for different parts of the Lesson Unit share the same background. The user may select one of the black arrows 648 to hear a corresponding pair of words or, alternatively, the user may select one of the word icons 650 to hear the corresponding word. The PLAY_ALL icon 652, if selected, will play all of the sounds listed. If the RECORD icon 654 is selected, an optional display of a gauge (not shown) and a message (not shown) indicating how much time the user will have to record may appear. Selecting the RECORD icon 654, a second time activates the recording process. Alternatively, if the message and gauge display do not appear, selecting the RECORD icon 654 once will activate the recording process.

After the recording has been made, three new icons (not shown) are displayed on the monitor 22 (FIG. 1). These three new icons correspond to a HEAR_SELF icon which plays the recording, the HEAR_BOTH icon which plays the model and the recording, and the SAVE icon which permanently saves the recording in the user's personal file.

If the user has not previously identified himself when the SAVE icon is selected, a dialog box appears requesting the user to enter a user identification code in the system. After the recording has been saved, a HEAR_SAVED icon is displayed on the screen. The HEAR_SAVED icon opens and displays the first screen of the user's Personal File and allows the user to play the saved sound recordings.

Referring now to FIG. 6D, a Sentence Drill screen 656 includes a DIRECTIONS icon 658, a NEXT icon 660, a MENU icon 662 and a RECORD icon 664 which perform the same functions as the like icons described above in conjunction with FIG. 6C. Thus, the sentence drills are similar to above explained minimal pair drills in that the recording function works in the same way, and directions are available by selecting an icon.

The sentence may be played by selecting the black arrow icon 666. A target word 668 is listed above each of the sentences 669 to be practiced. The target word 668 helps the user identify the problem sound in the sentence. After the user has learned to produce a particular sound in the target word 668, the sentence drills may be practiced by a user.

Figure 6E:
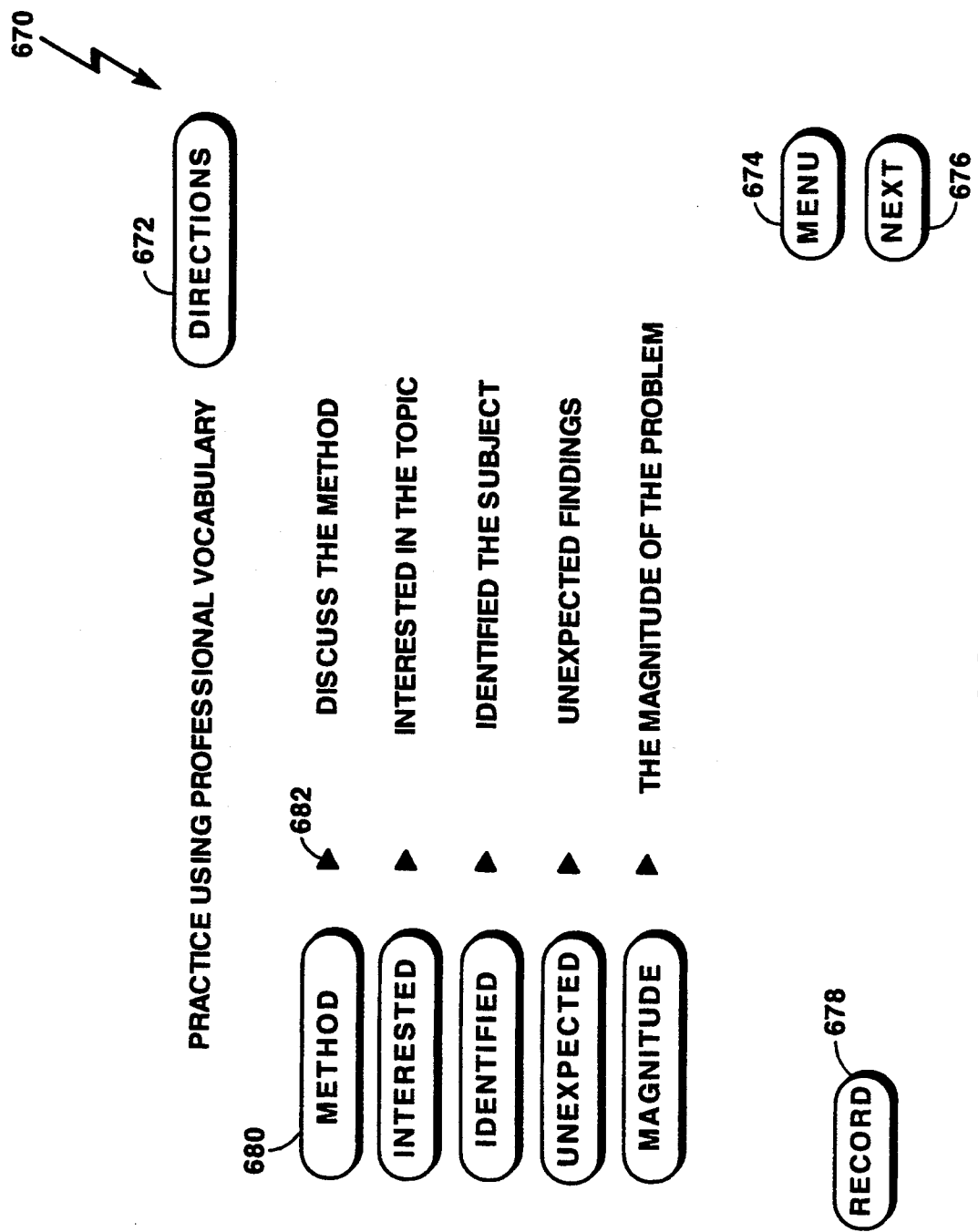

Referring now to FIG. 6E, a Professional Vocabulary Drill screen 670 includes a DIRECTIONS icon 672, a NEXT icon 674, a MENU icon 676 and a RECORD icon 678 which perform the same functions as the like icons described above in conjunction with FIGS. 6C and 6D above. Thus, the professional vocabulary drills are similar to above explained sentence drills in that the recording function works in the same way, and directions are available by selecting an icon.

A word from the TechVocab stack represented by an icon 680 may be played by selecting the icon 680. By selecting the arrow icon 682, the same word may be played in a phrase. Thus, the word in this drill may be used to practice stress patterns. The words and phrases may continue to increase in complexity, thus allowing the user to practice the target sound in relatively complex words in the context of a relatively complex phrase.

Lessons Table of Contents Option

Figure 7:
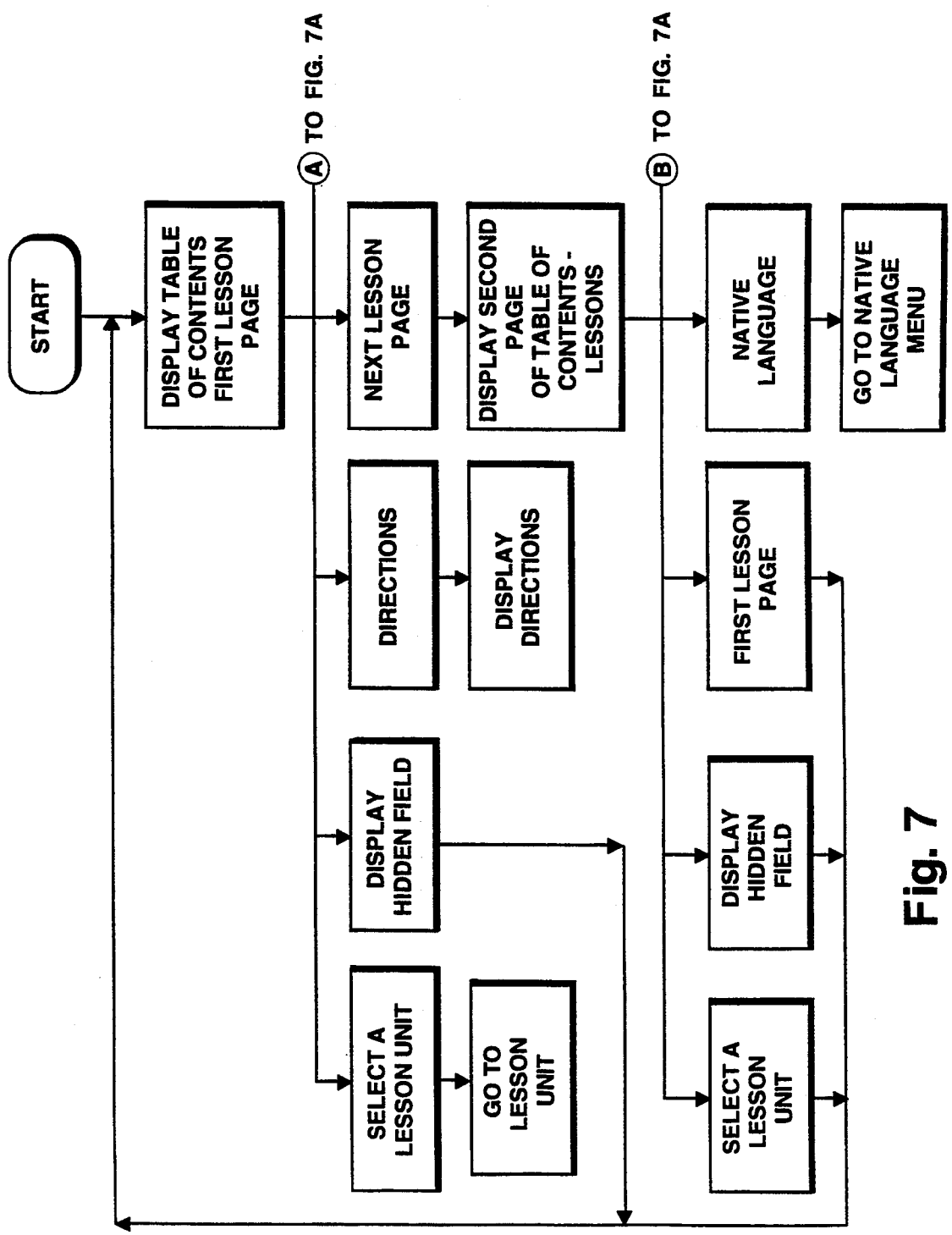
FIGS. 7 and 7A are a series of flow type diagrams illustrating of the program options available in a Table of Contents menu.
Figure 7A:
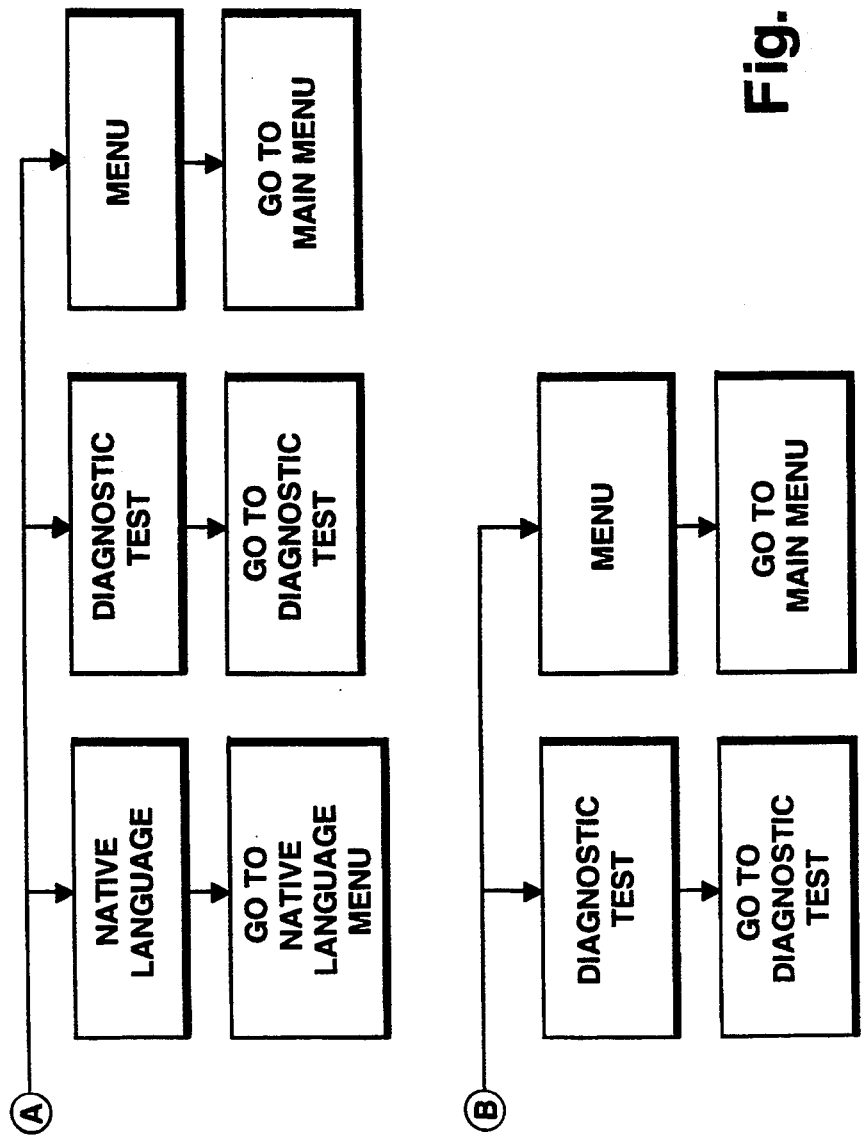

Referring now to FIGS. 7 and 7A a series of flow type diagrams illustrates the program flow in the Table of Contents option and FIG. 7A illustrates an exemplary screen from the Table of Contents option.

Figure 7B:
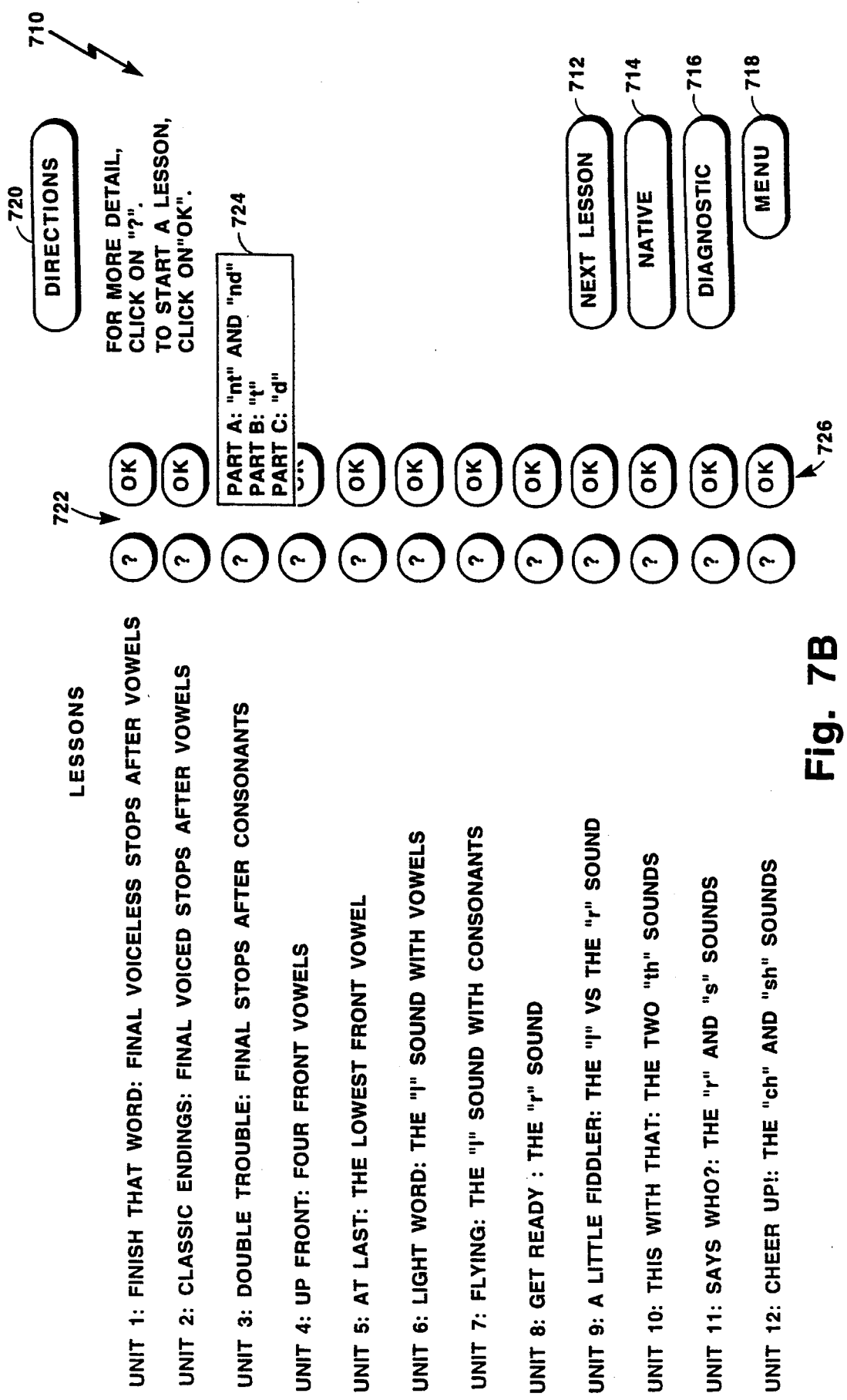
FIG. 7B is a graphical illustration of a screen available from the Table of Contents menu.

Referring now to FIG. 7B The Lessons Table of Contents option provides a First Lesson Page screen 710 which displays a print-oriented description of the material available for study using the system 10. A NEXT_LESSON_PAGE icon 712 leads to a second similar screen (not shown) which itself may include an icon (not shown) leading back to the First Lesson Page screen 710. Also available from the Table of Contents screen 710 is other lesson sequence planning assistance via the NATIVE_LANGUAGE icon 714 which leads to the Native Language screen (FIG. 8) and the DIAGNOSTIC_TEST icon 716 (FIG. 9) which leads to the Diagnostic Test Screen (FIG. 10B) and a MENU icon 718 which leads to the Main Menu screen as described above.

Figure 2A:
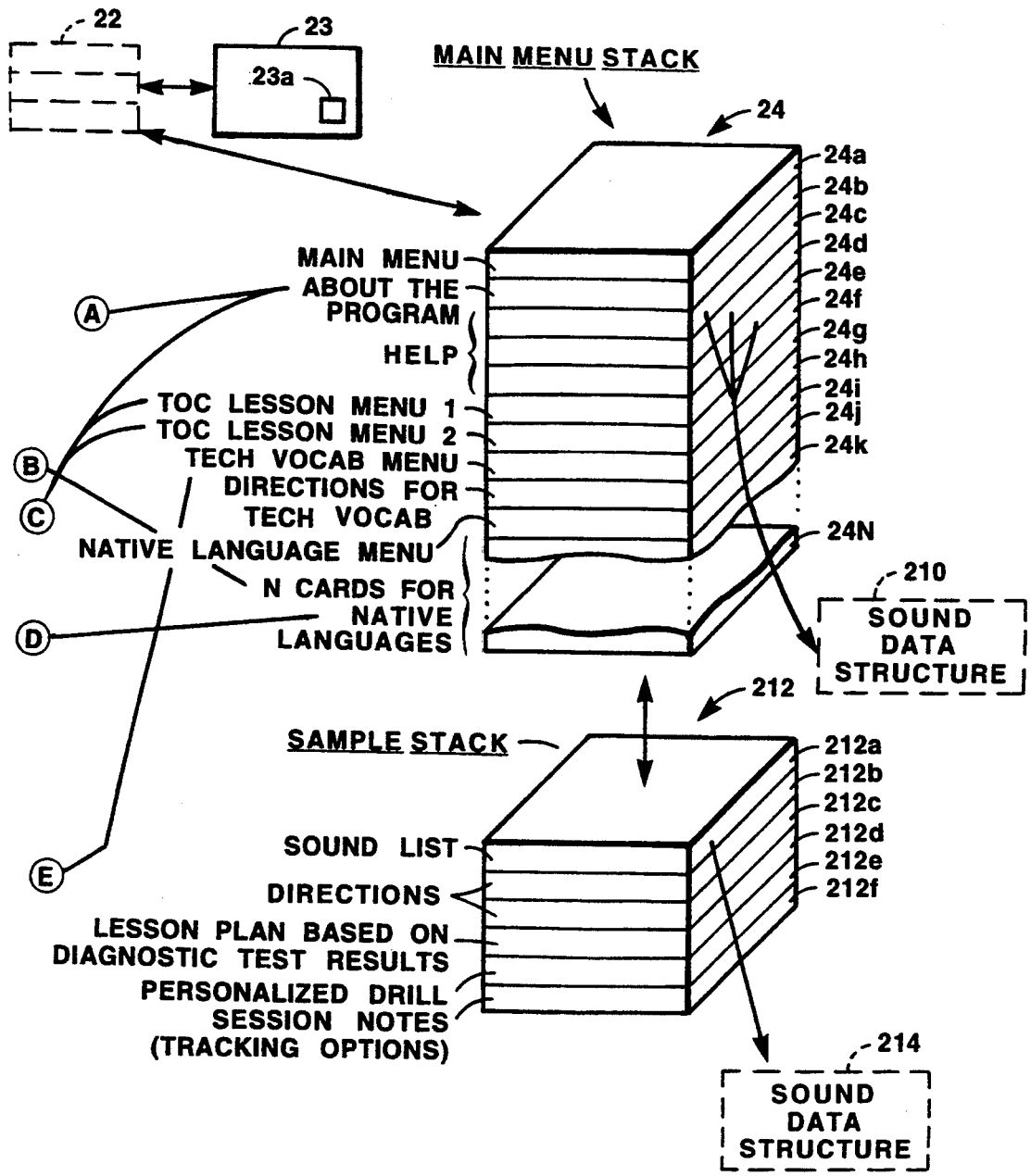
FIG. 2C is a pictorial representation of a card which may be of the type used in the program stacks of FIG. 2.

Directions for using the screen 710 and suggestions for planning lesson sequences based on the units which may be accessed from the screen are provided via a DIRECTIONS icon 720. The user may find out more about any lesson unit by selecting one of the "?" icons 722 which opens a window 724 giving a fuller description of the contents of the corresponding lesson unit. The window 724 closes when the "?" icon is deselected. The window 724 is one example of a hidden field portion of the card as illustrated in FIG. 2A. Thus, lessons screen 710 includes a plurality of hidden field portions each of which may be revealed by selecting the corresponding ? icon. The user may begin to use any one of the lesson units by selecting the corresponding OK icons 726 beside the description of the lesson unit.

Lesson Plans by Native Language Option

Figure 8:
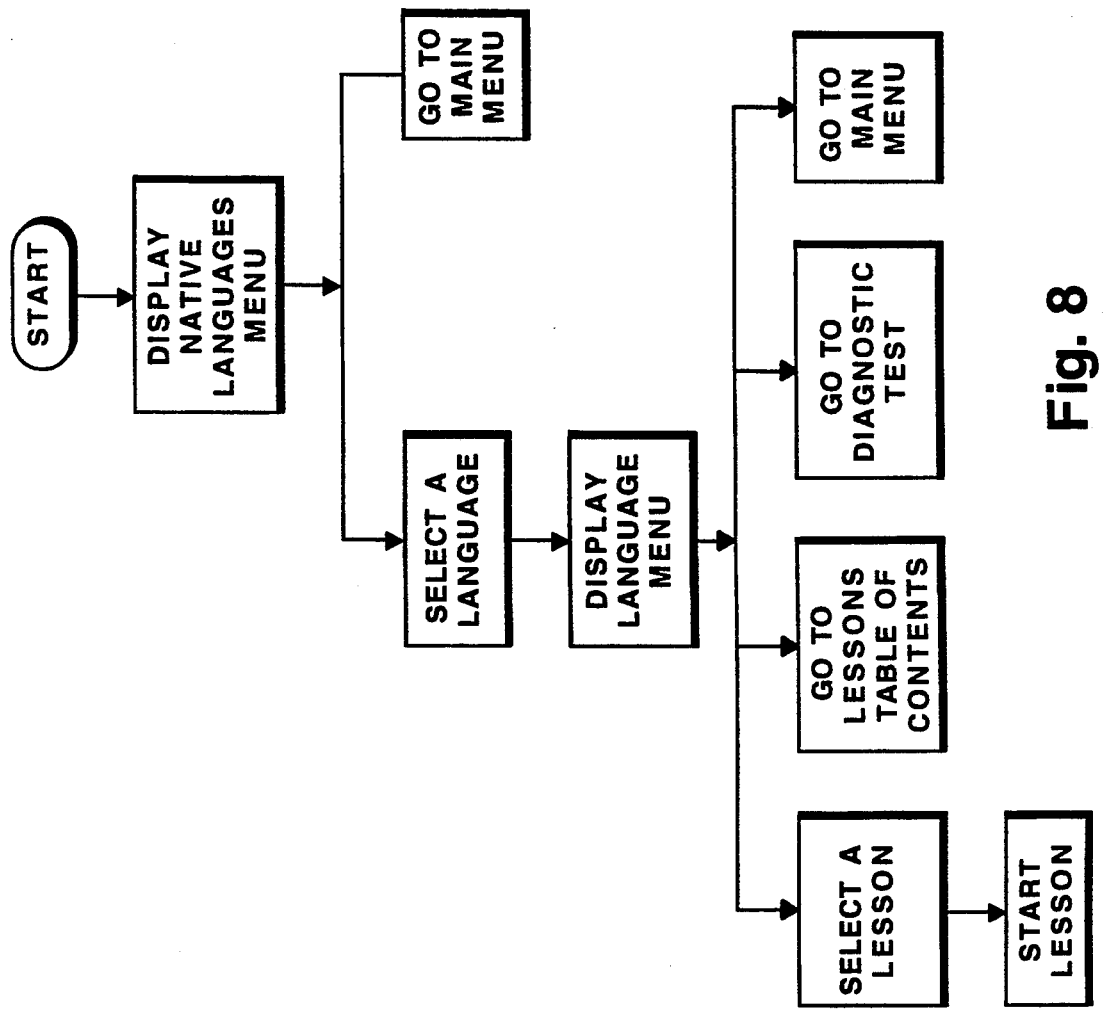
FIG. 8 is a flow type diagram of the program flow in a Native Languages menu.

Referring now to FIG. 8, a flow type diagram illustrating the program flow through the Native Language option is shown.

Figure 8A:
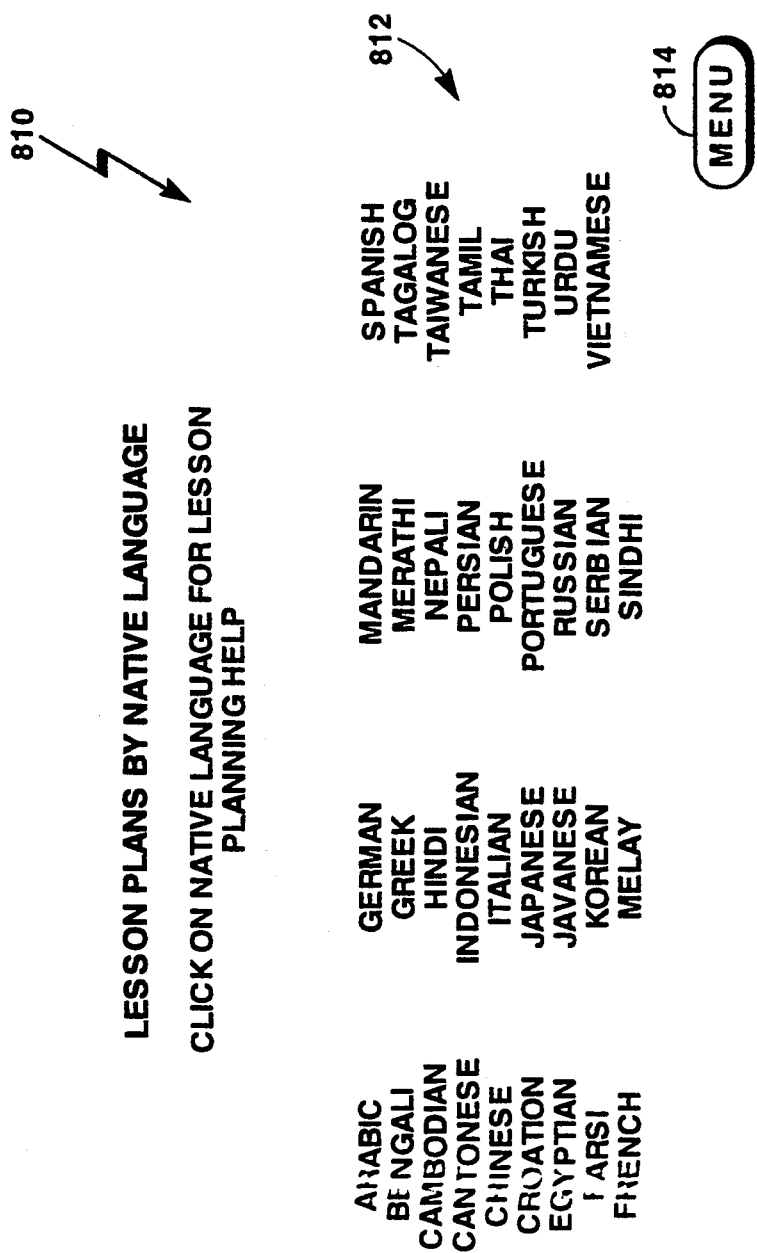

Referring now to FIG. 8A, the Lesson Plans by Native Language option allows the user to access a lesson sequence plan based on their native language. When the Native Language option is selected, a "Lesson Plans by Native Language" screen 810 is displayed on the monitor. The user may select one of the name icons 812 corresponding to the name of their native language. Alternatively, the user may select the MENU icon 814 which leads to the Main Menu 42 (FIG. 4).

Here, thirty-five name icons are displayed on the screen 810 and each of the name icons 812 lead to a corresponding Language Menu screen 816 (FIG. 8B) which may be displayed. Each of the Language Menu screens presents a lesson plan for speakers of that language. Those of ordinary skill in the art will recognize, of course, that more or fewer than thirty-five name icons may be used.

Referring now to FIG. 8B, an exemplary Language Menu screen 816 is illustrated. Here the Language Menu screen 816 provides The Lesson Plan for Speakers of Polish. This lesson plan is one screen in a series that share a common background. The foreground information is the first paragraph of text providing the plan for Polish speakers and the word "Polish" in the title. Also on the screen is a note regarding speaker uniqueness and suggestions for how to obtain other lesson sequence ideas. The language menu screen 816 also includes a UNIT_CONTENTS icon 818 which leads to the corresponding "Tables of Contents" screens described above in conjunction with FIGS. 7 and 7B. A matrix of lesson number icons 820 leads to the corresponding lesson from the Lesson Plan for Speakers of Polish screen 816. A similar matrix of icons 820 is present in all of the lesson plan screens.

The DIAGNOSTIC TEST icon 822 leads to a first screen of the Diagnostic Test Stack described below in conjunction with FIG. 9 and the MENU icon 824 leads to the Main Menu screen 42 (FIG. 4).

Technical Words by Profession Option

Figure 9:
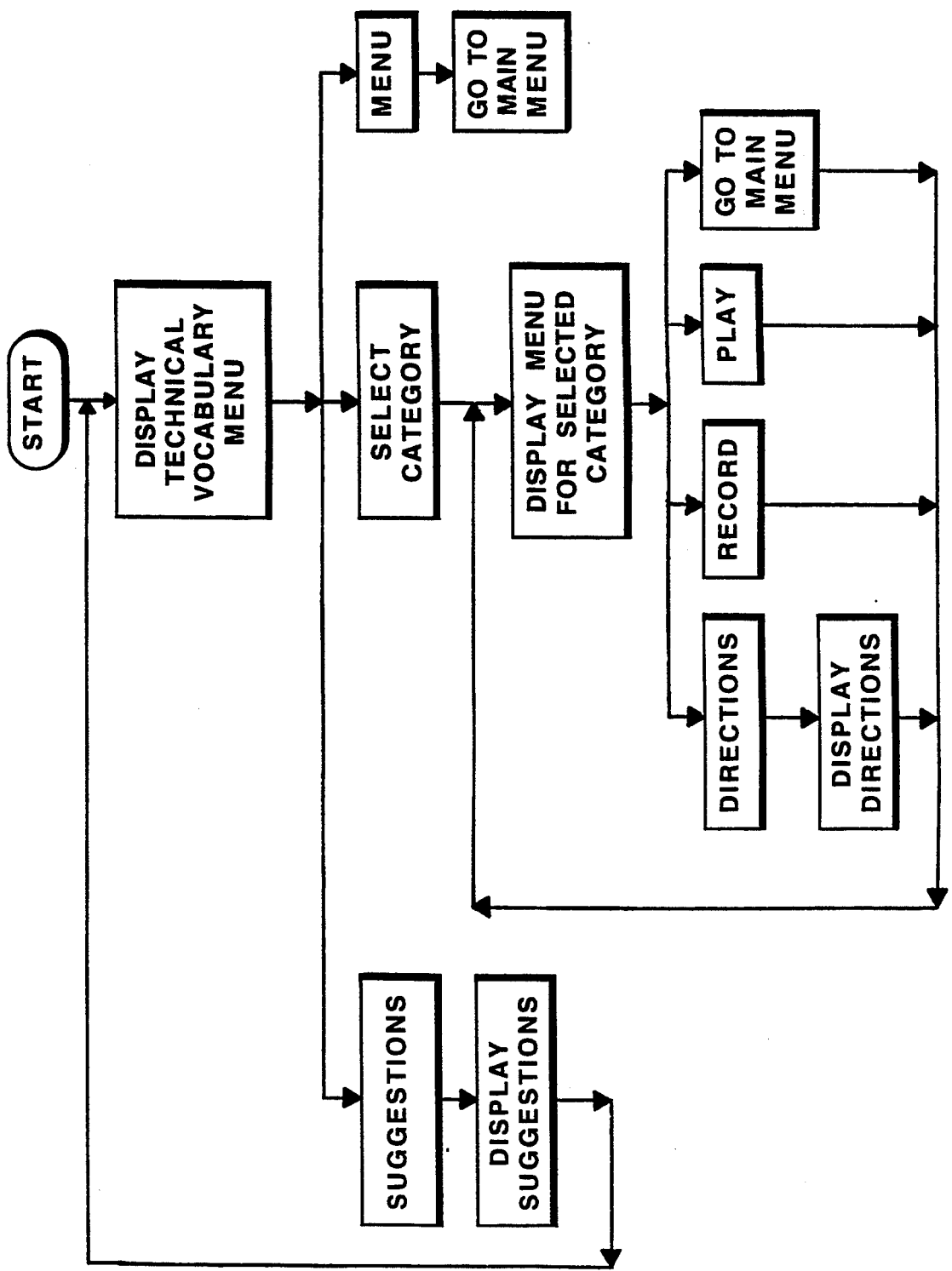
FIG. 9 is an exemplary flow type diagram of the options available in a Technical Vocabulary Stack.

Referring now to FIG. 9, an exemplary, simplified flow type diagram illustrating the program flow through the TechVocab option is shown.

Figure 9A:
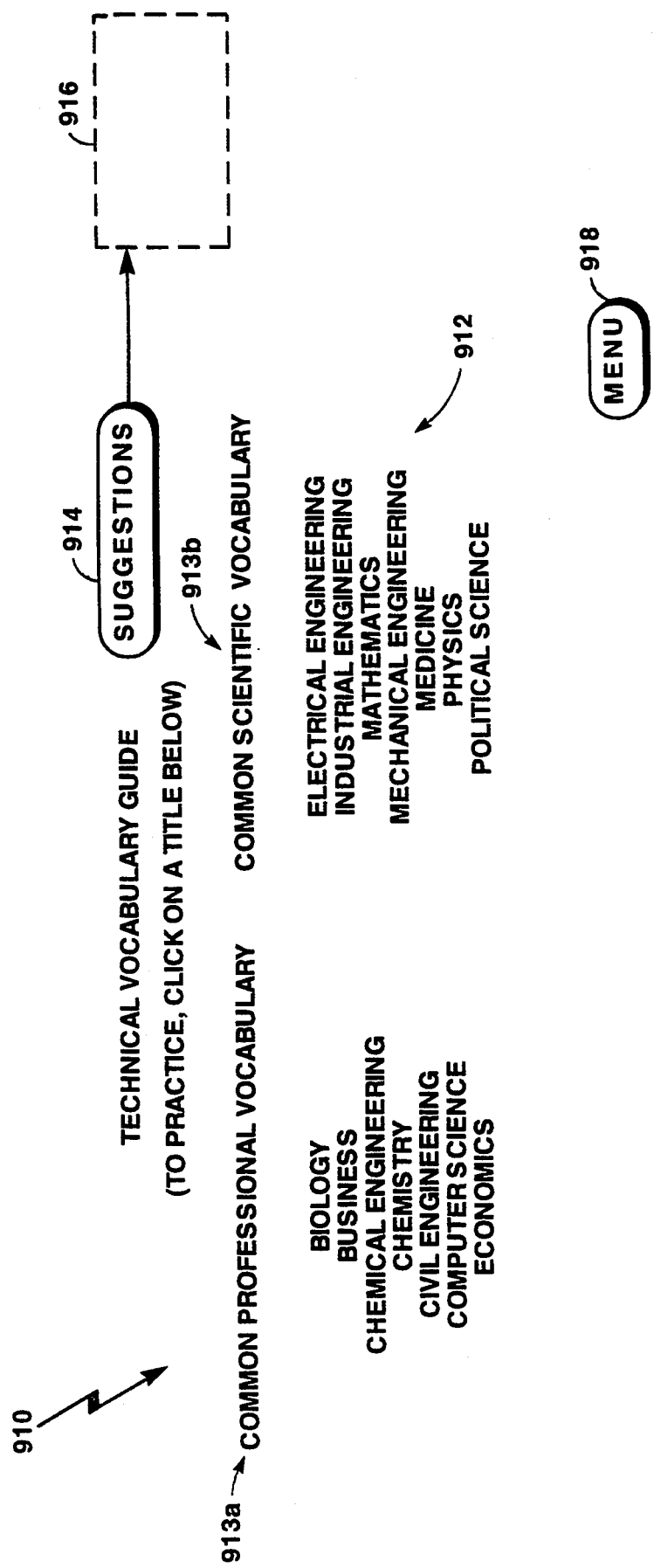
FIGS. 9A and 9B are a series of graphical illustrations of screens available from the Technical Vocabulary Stack.

Referring now to FIG. 9A, The TECHNICAL_WORDS_BY_PROFESSION icon 42i (FIG. 4) from the Main Menu screen 42 (FIG. 4) leads to a Technical Vocabulary Guide (TechVocab) screen 910. The TechVocab screen 910 presents the name icons 912 corresponding to here fourteen professions. Those of ordinary skill in the art will recognize that any number of icons corresponding to different professions may be provided. The Technical Vocabulary Guide screen 910 also includes a COMMON_PROFESSIONAL_VOCABULARY icon 913a and a COMMON_SCIENTIFIC_VOCABULARY icon 913b. A SUGGESTIONS icon 914 leads to a Directions screen 916 from which the user may read suggestions about how to use the technical vocabulary section.

The user may select one of the name icons 912 corresponding to the name of one of the technical subject areas. Alternatively the user may select the MENU icon 918 which leads to the Main Menu screen 42 (FIG. 4). Here, sixteen icons are displayed on the screen 910 and each of the name icons 912 lead to a corresponding technical vocabulary menu screen which may be displayed. Each of the name icons presents a technical vocabulary corresponding to the name. Thus, to use the TechVocab screen 910, the user selects on one of the name icons 912, and the appropriate screen from the Technical Vocabulary Stack is presented.

Figure 9B:
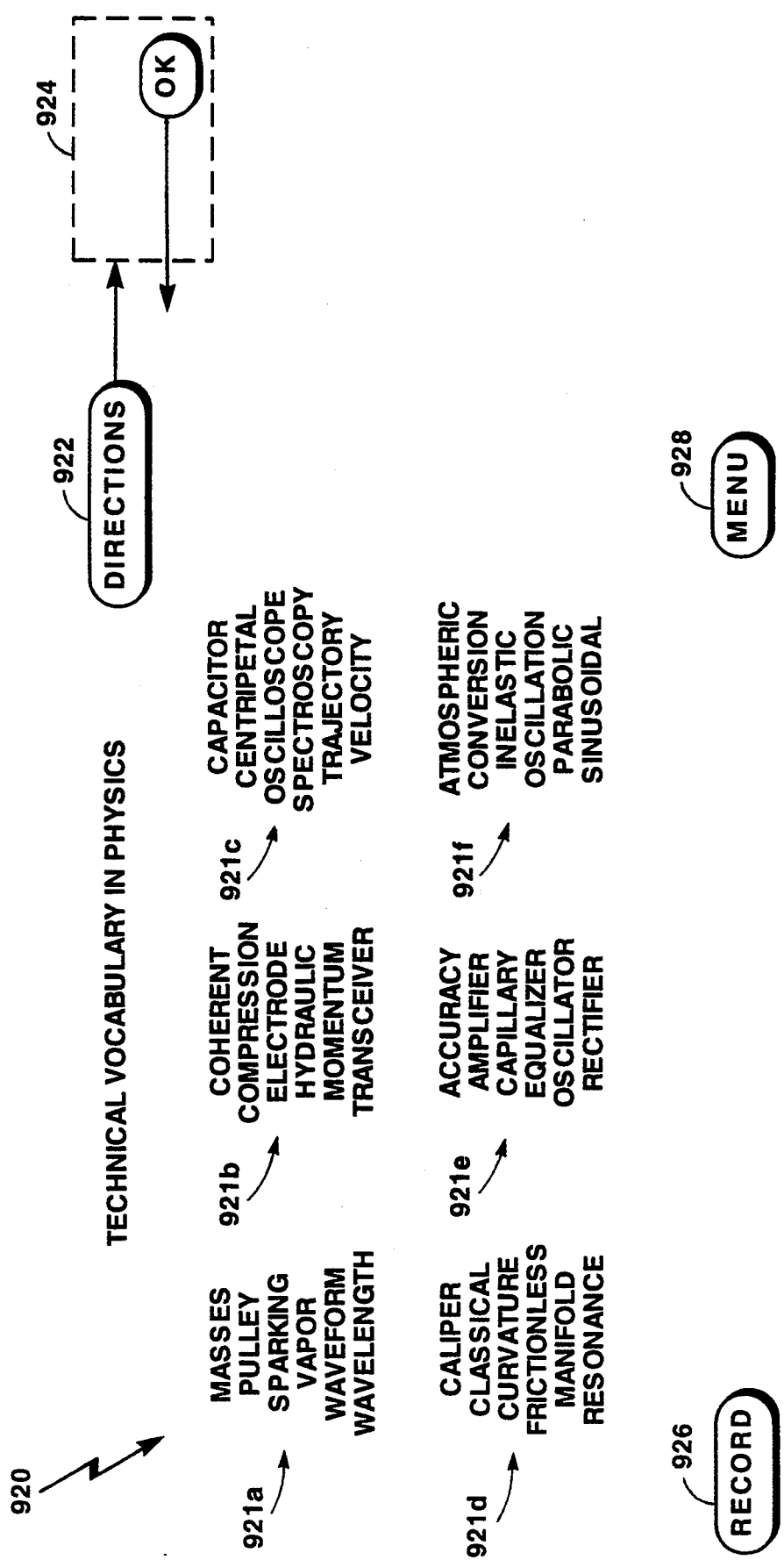

Referring now to FIG. 9B, an exemplary TechVocab menu screen 920 is illustrated. Here the TechVocab menu screen 920 provides technical vocabulary for the subject of Physics. As mentioned above, the words are grouped according to stress patterns. Thus, the example shown here includes six (6) groups 921a through 921f of six (6) words each.

Each word in a particular one of the groups 921a through 921f has a like number of syllables, and, furthermore, the same syllable in each of the words is stressed. Thus, word group 921a includes two (2) syllable words, the first syllable of each word being stressed. On the other hand, word group 921f includes six four (4) syllable words, the third syllable of each word being stressed. Thus the user may practice words according to stress.

This is particularly useful for those users have a native language which includes stress patterns and rules of stressing words which are significantly different from the foreign language which the user is trying to learn.

A DIRECTIONS icon 922 displays a Directions screen 924 which provides directions to a user. An "OK" icon 925 on the directions screen returns the user to the Technical Vocabulary screen 920. A similar "OK" icon appears on many directions screens throughout the program.

The RECORD icon 926 operates in a manner similar to the RECORD icon described above in conjunction with the description of the Lesson Units in FIG. 6C. As in the lesson units after a recording has been made, the user has the further options of listening to this recording, listening to both a pre-recorded model and one's own recording, and saving the recording. If the save option is selected, the number of options expands to include accessing the user's Personal Stack.

Diagnostic Test Option

Figure 10:
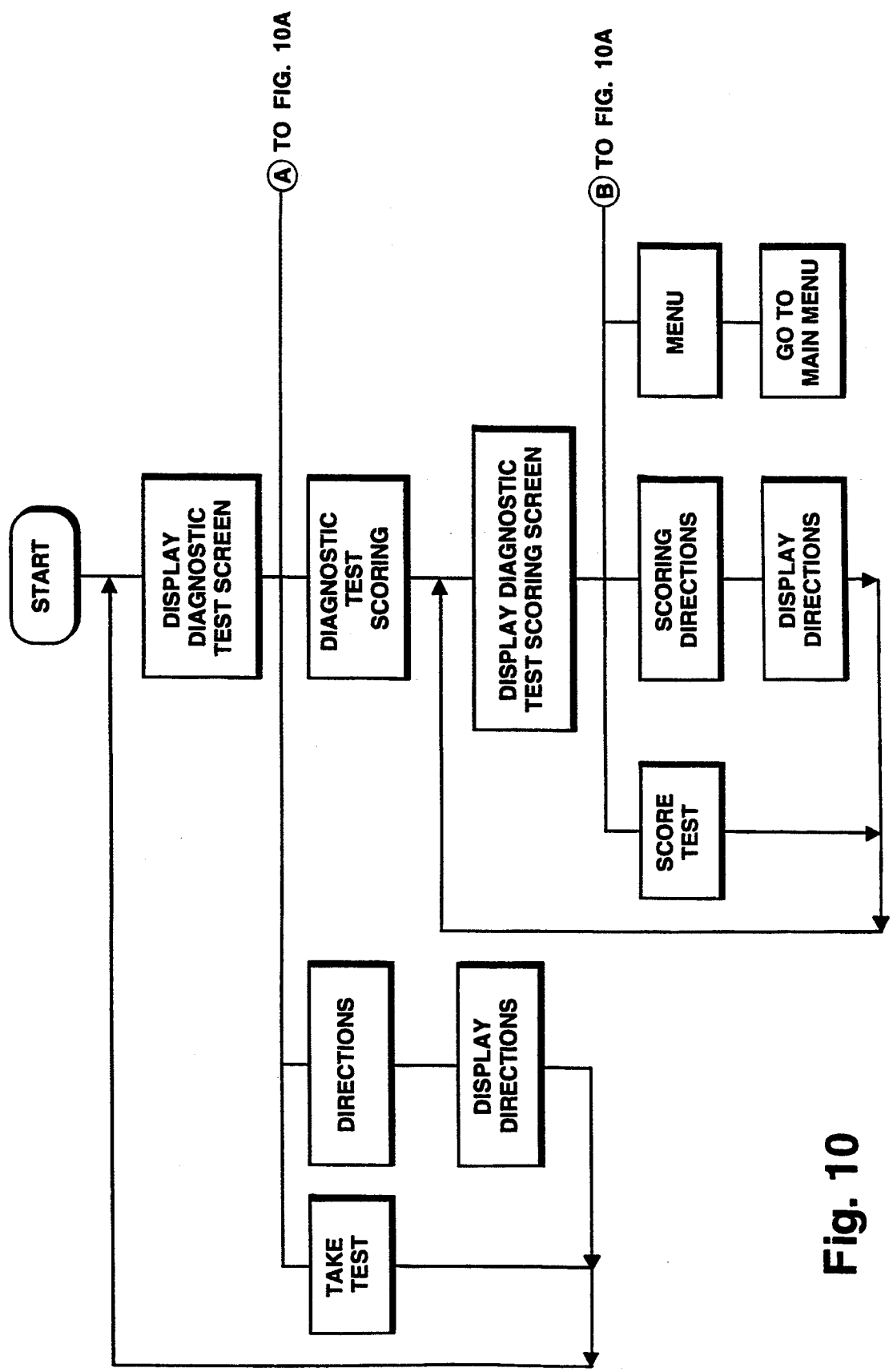
FIGS. 10 and 10A are a series of flow type diagrams illustrating the options available from a Diagnostics Stack.
Figure 10A:
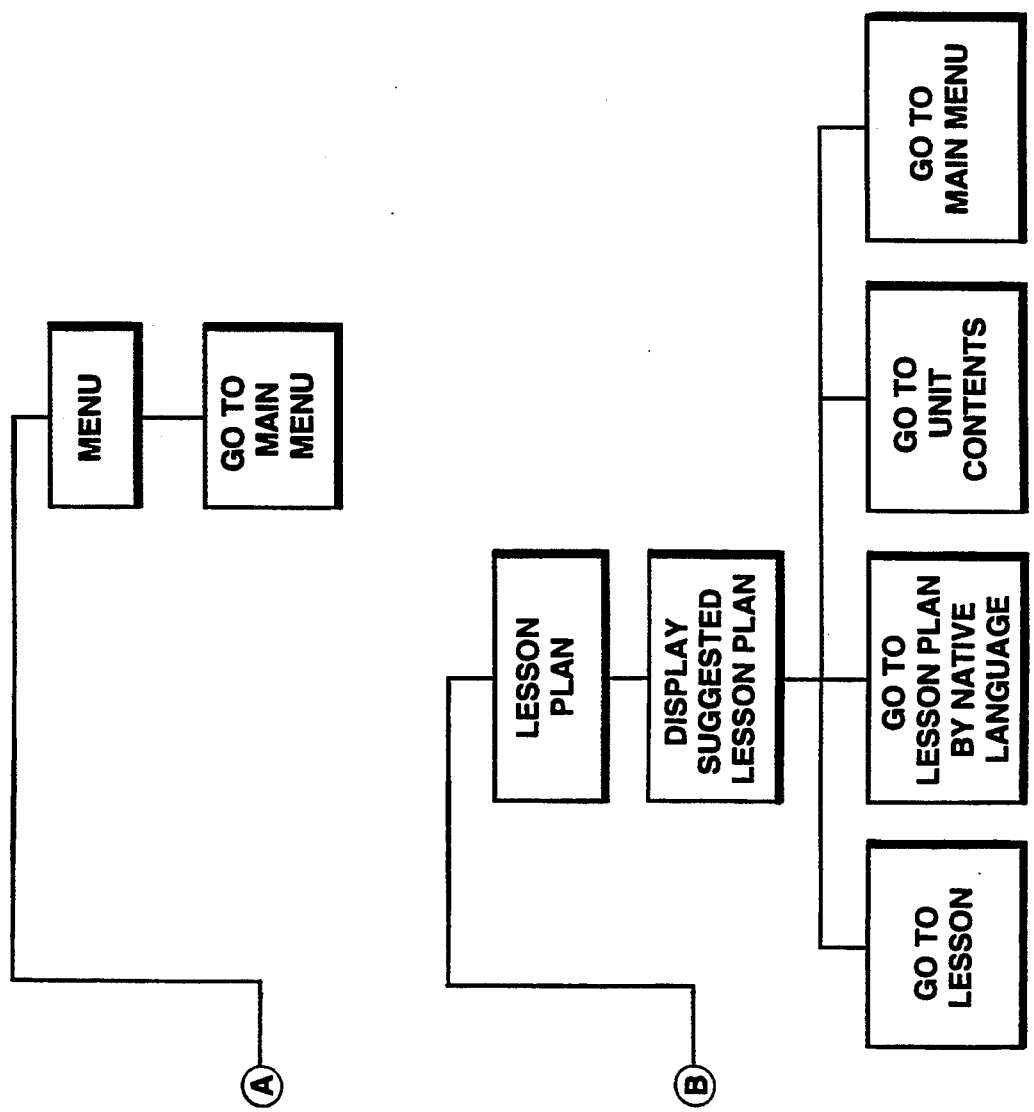

Referring now to FIGS. 10–10A a series of simplified flow type diagrams which illustrate the program flow through the Diagnostic Test option are shown.

Figure 10B:
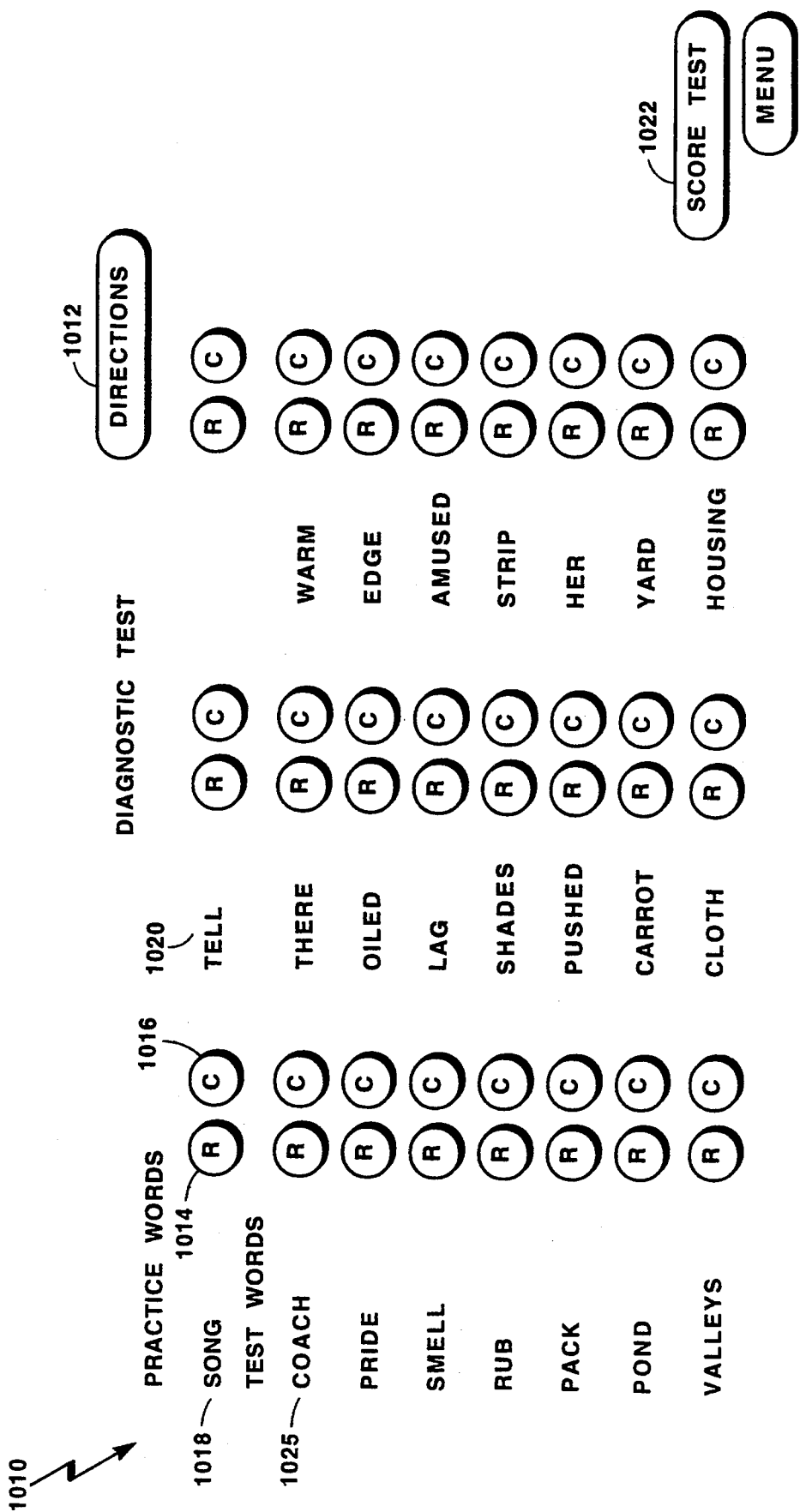
FIGS. 10B–10D are a series of graphical illustrations of screens available from the Diagnostic Stack.

Referring now to FIG. 10B, a Diagnostic Test screen 1010 from the Diagnostic Test Stack is shown. A DIRECTIONS icon 1012 provides the user with a direction screen (not shown).

The Diagnostic Test screen 1010 has a plurality of record icons "R" 1014 which allow the user to record words displayed on the screen. Each word to be recorded in the diagnostic test has its own record icon 1014 and its own check icon "C" 1016. The user selects the record icon, and speaks the word into the audio input device 24 (FIG. 1). The speech processor receives an analog representation of the word from the audio input device and generates a digital representation of the word which is stored in the Diagnostic Stack as a sound resource. Selecting the "C" icon 1016 plays the sound. Thus, the user may check to see if the recording was done correctly by selecting the corresponding check icon 1016.

Selecting the same one of the record "R" icons 1014 a second time reactivates the recording and replaces the old recording with the new recording. Two practice words 1018 and 1020 are provided to allow the user to become familiar with the procedure before recording the test words.

After the test words have been recorded, the instructor or a native speaker of English may score the test. The SCORE_TEST icon 1022 on the Diagnostic Test screen 1010 leads to a Diagnostic Test Scoring screen described below in conjunction with FIG. 10B.

Figure 10C:
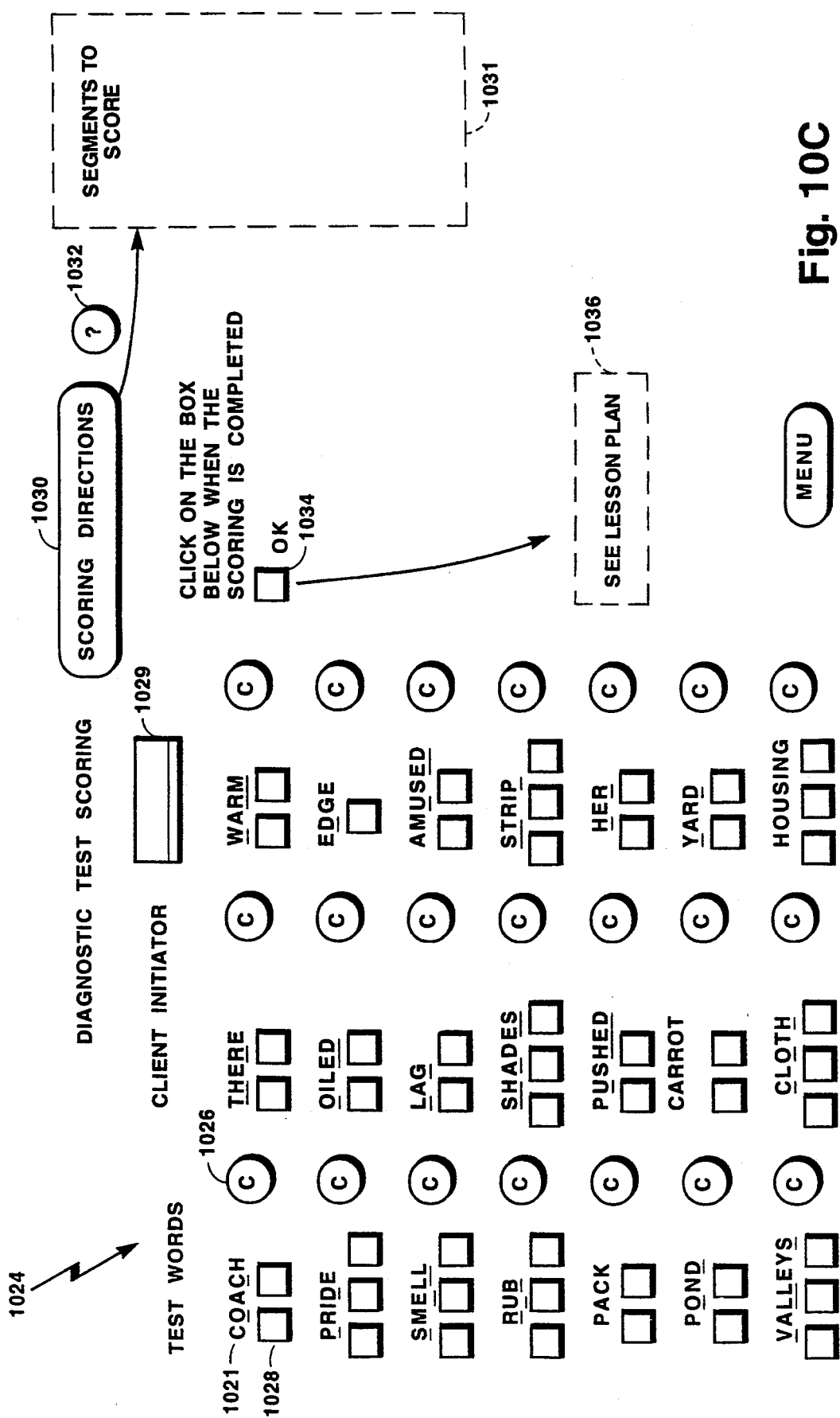

Referring now to FIG. 10C, a Diagnostic Test Scoring screen 1024 used for scoring the diagnostic test is shown to include a DIRECTIONS icon 1030 which provides a Directions screen 1031. Each of the test words 1021 displayed on the Diagnostic Test Scoring screen 1024 has a corresponding "C" icon 1026 which will play the recorded pronunciation of the word by the user. Each of the test words 1021 also has underlined segments. Each underlined segment has a box below it. The instructor listens to the user articulate the test words 1021, (or alternatively to a recorded articulation of the test words 1021) and subsequently judges whether the underlined segments were spoken with acceptable articulation. If the test words 1021 are not acceptably articulated, the instructor selects a corresponding one of the boxes 1028 via the GUI, which results in the letter "X" appearing in the box 1028. The "X" indicates that a particular portion of the word was unacceptably articulated. This procedure is carried out for each of the test words 1021. If the instructor changes their mind, the box may be deselected.

Also provided on the Diagnostic Test Scoring screen 1024 is a box 1029 into which the instructor may type the client's initials.

Scoring directions are available by selecting the SCORING_DIRECTIONS icon 1030. Additional help is available by selecting a "?" icon 1032. Selection of the "?" icon causes a window (not shown) to appear. The window displays text which gives more specific detail on the segments to score and unobtrusively provides less linguistically sophisticated scorers with information needed to avoid mistakes (a reminder that the orthography doesn't match the spelling in a few cases).

When the scoring is complete, the scorer selects the OK icon 1034 using the GUI and a hidden SEE_LESSON_PLAN icon 1036 is displayed. Selecting the OK icon 1034 activates the calculation of the suggested lesson plan for the user. Each of the boxes 1028 associated with a test word 1021 is keyed to a Unit part. If a box is checked, then the associated Unit part is slated to appear in the suggested lesson plan. The order of the Unit parts is predetermined in a hierarchy of importance. The selected Unit part names in correct sequence are then placed in a suggested lesson plan on the last screen of the stack. The suggested lesson plan is also automatically entered in the user's Personal File. The user initials typed by the instructor are used by the system to identify the file in which to put the lesson plan. When the suggested lesson plan has been calculated, the SEE_LESSON_PLAN icon 1036 appears on the Diagnostic Test Scoring screen 1030.

When the user selects the SEE_LESSON_PLAN icon the last screen of the stack appears, a Lesson Plan Based on Diagnostic Results.

Figure 10D:
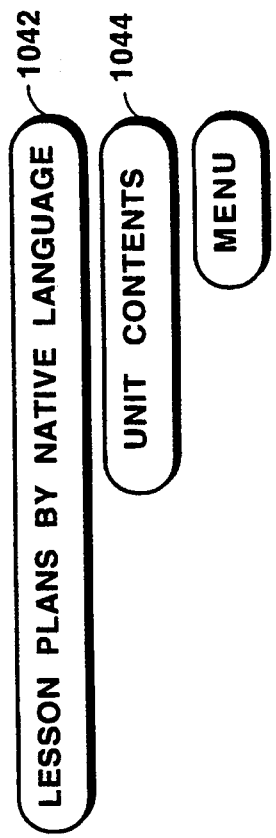

Referring now to FIG. 10D a Lesson Plan Based on Diagnostic Test Results screen 1038 is used to show the diagnostic test results and to access the lessons or other lesson planning assistance. The Lesson Plan Based on Diagnostics Test Results screen 1038 displays the suggested lesson sequence described above. The screen 1038 also includes a matrix of lesson number icons generally denoted 1040 which allow the user to begin any of the lessons by selecting a lesson number. The user may also access other lesson planning assistance via the LESSON_PLANS_BY_NATIVE_LANGUAGE icon 1042 or the UNIT_CONTENTS icon 1044 whose functions have been described above.

Once the diagnostic test has been taken, the user may view the results in a later session by accessing the screen in the Personal File which contains the results. The entire diagnostic test with its associated sounds may be transferred to a floppy disk, erased from the hard drive, and stored for future comparison with a later taken diagnostic test which the user takes after working with the program. An unused copy of the diagnostic test may be copied to the hard drive for the next client. Other file management schemes are also possible for the instructor.

Clinician Stack and Tracking Option

Figure 11:
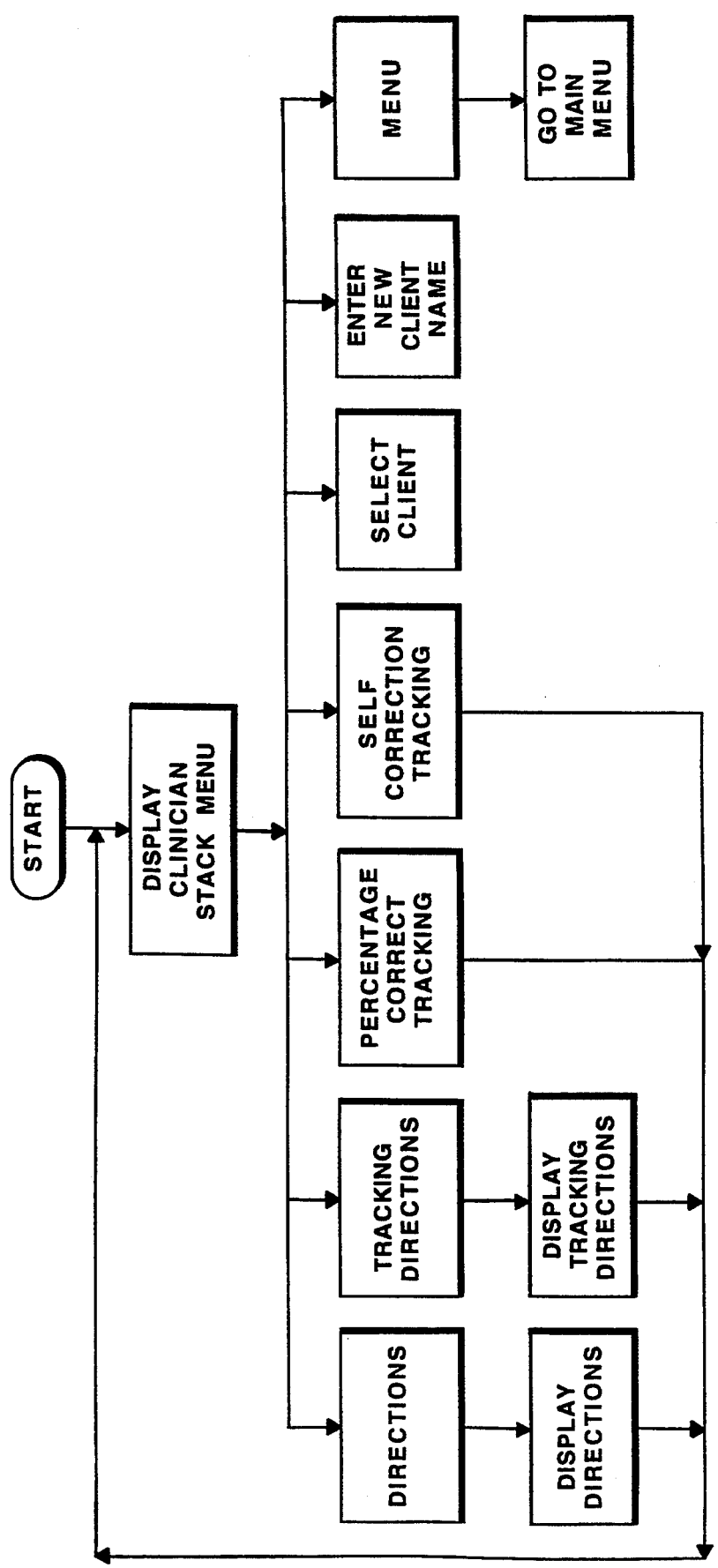
FIG. 11 is a flow type diagram of the program options available in a Clinician Stack of the language learning system of FIG. 1.

Referring now to FIG. 11, a high level flow type diagram shows the program option available in the Clinician Stack.

Figure 11A:
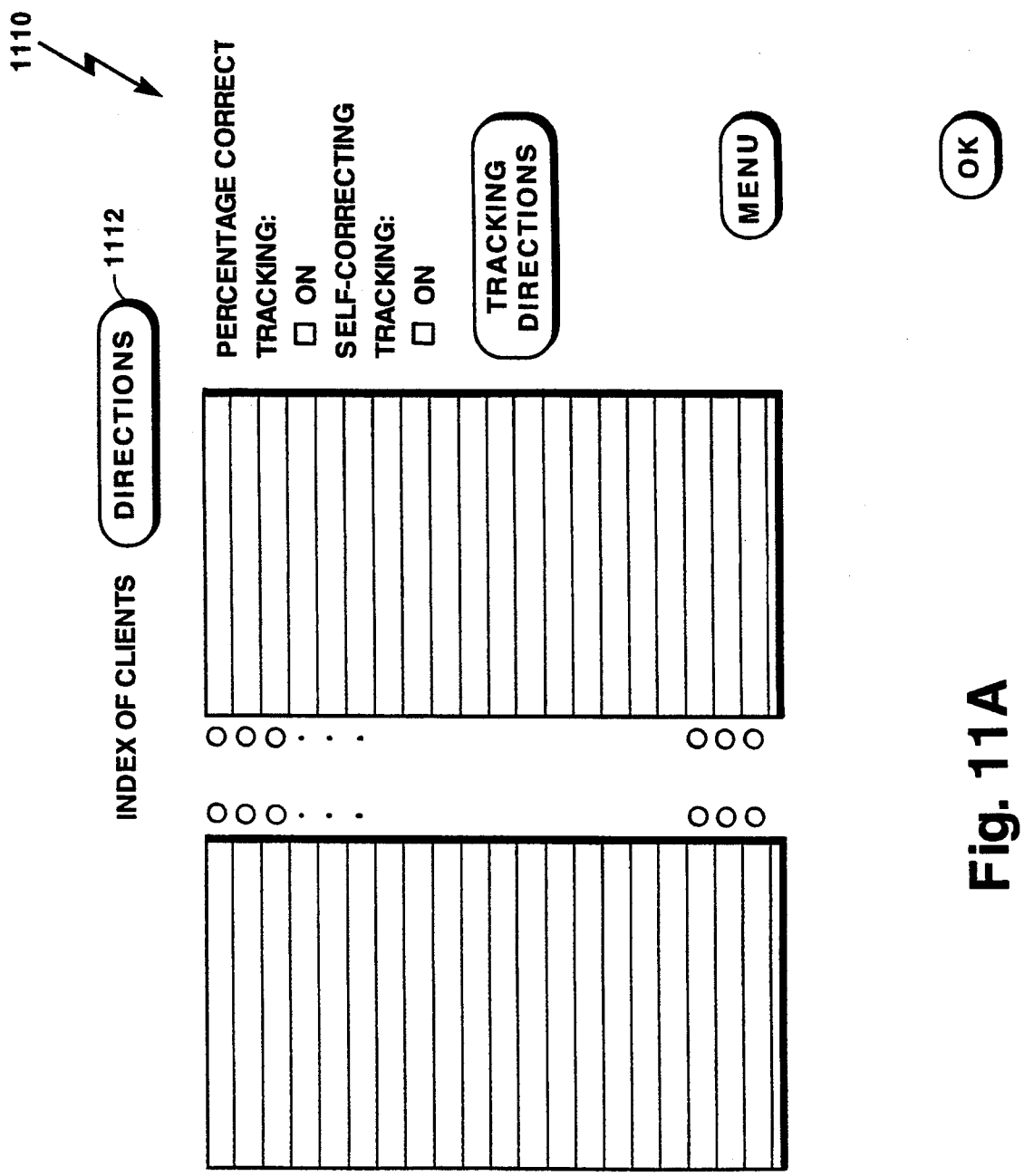
FIG. 11A is a graphical illustration of a screen from the Clinician Stack.

Referring now to FIG. 11A, an illustration of an Index of Clients screen 1110 from the Clinician Stack displays a list of Clients. A Tracking feature may be turned on from this screen.

The tracking option may be used for example by an instructor such as a speech language pathologist, who desires to keep a progress record of clients who require individual attention.

When the tracking option is being used, the clinician uses the keyboard while the client uses the graphical user interface. Every time the client makes the first imitation of a minimal pair, phrase or sentence, the clinician presses a key to indicate whether the imitation was acceptable. Scoring relates to the target phoneme, not to other phonemes or to prosodic features. In some sentences there are two targets phonemes which are both listed on the screen. The tracking option applies only to the first target phoneme. In the professional vocabulary section, tracking relates to the target embedded in the phrase not to the single words.

To record a client's results, the clinician would press the "x" key, for example, if the imitation is incorrect and the "c" key, for example, if the imitation is correct and acceptable. If the client is unable to produce a correct version of the target after working on the target, the clinician may press the "q" key or otherwise take no action before going on to the next model. After the last imitation has been recorded the clinician may press the "f" key to have the tally placed in the client's Personal File on the Session Notes card. The date, target sound, percentages initially correct and percentages correct on closing will be recorded on the Session Notes screen in the client's Personal File.

If the clinician desires to track the number of spontaneous self-corrections, this feature may be turned on in the Index of Clients screen. When a client makes a spontaneous self-correction of an incorrect imitation, the "s" key, for example, may be pressed and this information will be tallied and placed on the Session Information screen (FIG. 5E).

The client may save the recordings made by selecting the SAVE icon on the screen. If the clinician would like to save the recordings of incorrect and correct imitations using the keyboard the "1" (one) key may be pressed when it is desired to save a recording. This feature may be used whether or not tracking is turned on.

Having described preferred embodiments of the invention, it will now become apparent to one of skill in the art that other embodiments incorporating its concept may be used. It is felt therefore, that this invention should not be restricted to the disclosed embodiment, but rather should be limited only by the spirit and scope of the appended claims.

What is claimed is:

1. An interactive computer system for teaching pronunciation and accent reduction to a user comprises:
   a processor;
   a memory, coupled to said processor, said memory having stored therein a set of instructions corresponding to a plurality of presequenced accent reduction lessons for execution in a predetermined order by said processor wherein the predetermined order is determined by the user selecting a first one of:
   (a) the native language of the user; and
   (b) a subject area, wherein said subject area is selected from the group consisting of an engineering subject area and a physical science subject area;
   an input interface, coupled to said processor, for providing a user with control over the sequence in which the accent reduction lessons are executed by said processor;
   a monitor, coupled to said processor, for displaying visual indicators to the user, wherein said visual indicators correspond to said instructions;
   an audio input/output device, coupled to said processor, for recording sounds spoken by a user and for playing prerecorded sounds stored in said memory; and
   a speech processor, coupled to said processor and said audio input/output device, for providing stored signals to said audio input/output device, wherein in response to an instruction displayed on said monitor, a user speaks a sound into said audio input/output device and the sound is stored in said memory and the sound corresponds to a first one of:
   (a) a word;
   (b) a phrase; and
   (c) a sentence; and
   wherein said pre-recorded sounds in said memory correspond to stored digitized signals representative of the sound spoken by the user into said audio input/output device.

2. The interactive computer system of claim 1, wherein:
   in response to a predetermined instruction, a user speaks a sound into said audio input/output device and said sound is stored in the memory as a stored signal and said sound corresponds to a first one of:
   (a) a word;
   (b) a phrase; and
   (c) a sentence; and
   said pre-recorded sounds stored correspond to sequenced and stored digitized signals representative of the sound spoken into said audio input/output device,
   graphical user interface to Select program options and perform selected lessons;
   the processor calculates the percentage of correct and incorrect utterances spoken by the user; and
   the processor stores a result corresponding to the percentage of correct and incorrect utterances spoken by the user in a first predetermined memory location dedicated to the user.

3. The interactive computer system of claim 2, wherein:
   prior to said user speaking into said audio input/output device, said speech processor provides a signal to said audio input/output device wherein said signal corresponds to a model sound and the sound the user speaks into said audio input/output device corresponds to an imitation of said model sound;
   in response to an instruction, said speech processor provides the signal corresponding to the model sound to said audio input/output device; and
   in response to an instruction executed by said processor, said speech processor provides via said audio input/output device, an audio signal corresponding to the user's imitation of the model sound.

4. The interactive computer system of claim 3 wherein the model sound has a sound pattern having a particular complexity and when said audio input/output device provides the signal corresponding to the model sound, said audio input/output device also provides a presequenced series of sound targets sequenced according to the complexity of the sound pattern.

5. The interactive computer system of claim 1, wherein:
   the input interface includes an input terminal and a graphical user interface, and the number of correct and incorrect utterances spoken by the user are recorded by an instructor using the input terminal while the user simultaneously utilizes the 6. A method for teaching pronunciation and accent reduction to a user, said method comprising the steps of:
   displaying a first menu on a monitor, said first menu having a first plurality of user selectable options;
   selecting, with a user interface device, a first user selectable option from said first plurality of user selectable options wherein said first user selectable option is selected according to a first one of the following criteria:
   a first language corresponding to a native language of a user;
   a first subject area wherein said first subject area, is selected from the group consisting of an engineering subject area and a physical science subject area; and a phonetic stress pattern; and
   executing in a predetermined order by a processor, a plurality of steps determined by the first user selectable option selected in said selecting step, wherein when said first user selectable option is selected according to a first language, said plurality of steps correspond to a first lesson plan to teach pronunciation and accent reduction to a user, wherein said first lesson plan is organized according to the selected first language and when said first user selectable option is selected according to a second different language, said plurality of steps correspond to a second lesson plan to teach pronunciation and accent reduction to the user, wherein said second lesson plan is organized according to the selected second language and wherein the organization of the first and second lesson plans is different.

7. The method of claim 6 wherein:
said executing step further comprises the steps of:
displaying a second menu on said monitor, said second menu having a second plurality of user selectable options; and
selecting, with a user interface device, a first menu option from said second plurality of user selectable options.

8. The method of claim 7 further comprising the steps of:
executing said first menu option; and
displaying a first one of said first and second menus.

9. A method for teaching accent reduction and speech pronunciation to a user comprising the steps of:
performing a diagnostic test on the user;
computing the results of said diagnostic test; and
executing, in a processor, a plurality of lessons stored in a memory to teach pronunciation and accent reduction to the user wherein the order in which said lessons are executed is determined by the results of said diagnostic test computed in said computing step and wherein said diagnostic test comprises the steps of:
recording, with an audio input/output device, at least one word spoken by the user;
grading, by a second user, said at least one word with a predetermined grading criteria;
calculating, in said processor, a value corresponding to the results of the grading step; and
calculating a suggested lesson plan, in said processor, wherein said suggested lesson plan corresponds to a series of lessons having a predetermined order, said series of lessons corresponding to selected lessons from a plurality of lessons stored in a memory, wherein said predetermined order of lessons is determined in response to the calculating a value step.

10. The method of claim 9, wherein said method of performing the diagnostic test further comprises the steps of:
storing the suggested lesson plan in a first predetermined memory location;
storing the suggested lesson plan in a second predetermined memory location; and
displaying the suggested lesson plan on a monitor.

11. The method of claim 9, wherein the step of recording at least one word spoken by the user includes the step of playing each of said at least one words with the audio input/output device such that the user is able to listen to each of the at least one words.

12. The method of claim 9, wherein said grading step further includes the steps of:
indicating the number of correct and incorrect utterances spoken by the user; and
summing, by said processor, for each of the presequenced lessons the number of incorrect utterances spoken by the user in each particular presequenced lesson.

* * * * *